United States Patent

Yamanaka et al.

[11] 3,864,678
[45] Feb. 4, 1975

[54] VEHICLE COLLISION ANTICIPATING DEVICE

[75] Inventors: Teruo Yamanaka, Seto; Takayuki Kato, Oaza Nishiishiki; Osamu Ozeki, Nagoya; Kazuo Sato; Minoru Bito, Toyota, all of Japan

[73] Assignees: Kabushiki Kaisha Toyota Chuo Kenkyusho; Toyota Jidosha Kogyo Kabushiki Kaisha, both of Aichi-ken, Japan

[22] Filed: Apr. 4, 1973

[21] Appl. No.: 347,776

[30] Foreign Application Priority Data
Apr. 8, 1972 Japan.............................. 47-35337

[52] U.S. Cl............. 343/9, 343/7 ED, 343/112 CA
[51] Int. Cl................................................ G01s 9/44
[58] Field of Search ........... 343/7 ED, 112 CA, 9, 8, 343/5 PD

[56] References Cited
UNITED STATES PATENTS

| | | | |
|---|---|---|---|
| 3,394,342 | 7/1968 | Walker.......................... | 343/112 CA |
| 3,687,213 | 8/1972 | Sato et al. ........................ | 343/7 ED |
| 3,697,985 | 10/1972 | Faris et al........................ | 343/7 ED |
| 3,742,497 | 6/1973 | Sato et al. ......................... | 343/7 ED |
| 3,745,572 | 7/1973 | Sato et al. ........................ | 343/7 ED |
| 3,750,168 | 7/1973 | Schrader et al............. | 343/112 CA |
| 3,757,325 | 9/1973 | Sato et al. ......................... | 343/7 ED |
| 3,760,415 | 9/1973 | Holmstrom et al............... | 343/7 ED |

*Primary Examiner*—Maynard R. Wilbur
*Assistant Examiner*—G. E. Montone

[57] ABSTRACT

An improvement of a vehicle collison anticipating device using transmitted and reflected frequency-modulated continuous waves is provided. A low frequency wave is produced by mixing a part of a transmitted wave and a reflected wave from an object. The low frequency wave and at least one Doppler signal obtained from the low frequency wave are signal processed so as to generate signals. A collision time which is determined by a distance between the vehicle and object and a relative velocity of the object with respect to the vehicle, is detected. An intensity of said Doppler signal is detected so as to detect the presence of the object in a predetermined detection range determined by the positions and angles of the transmitting and receiving antennas. A collision of the object against the vehicle is anticipated by detecting said collision time and said intensity of the Doppler signal.

19 Claims, 18 Drawing Figures

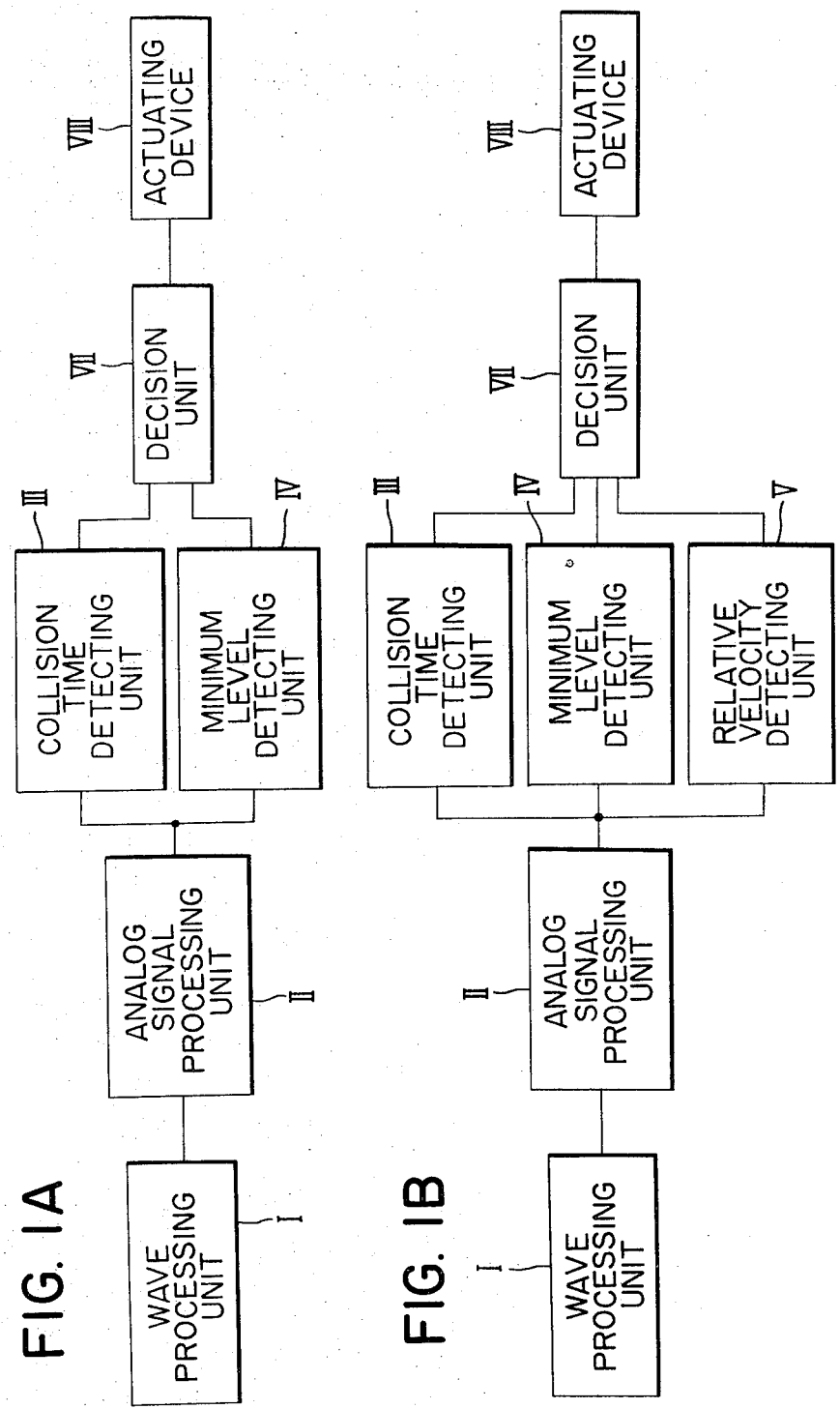

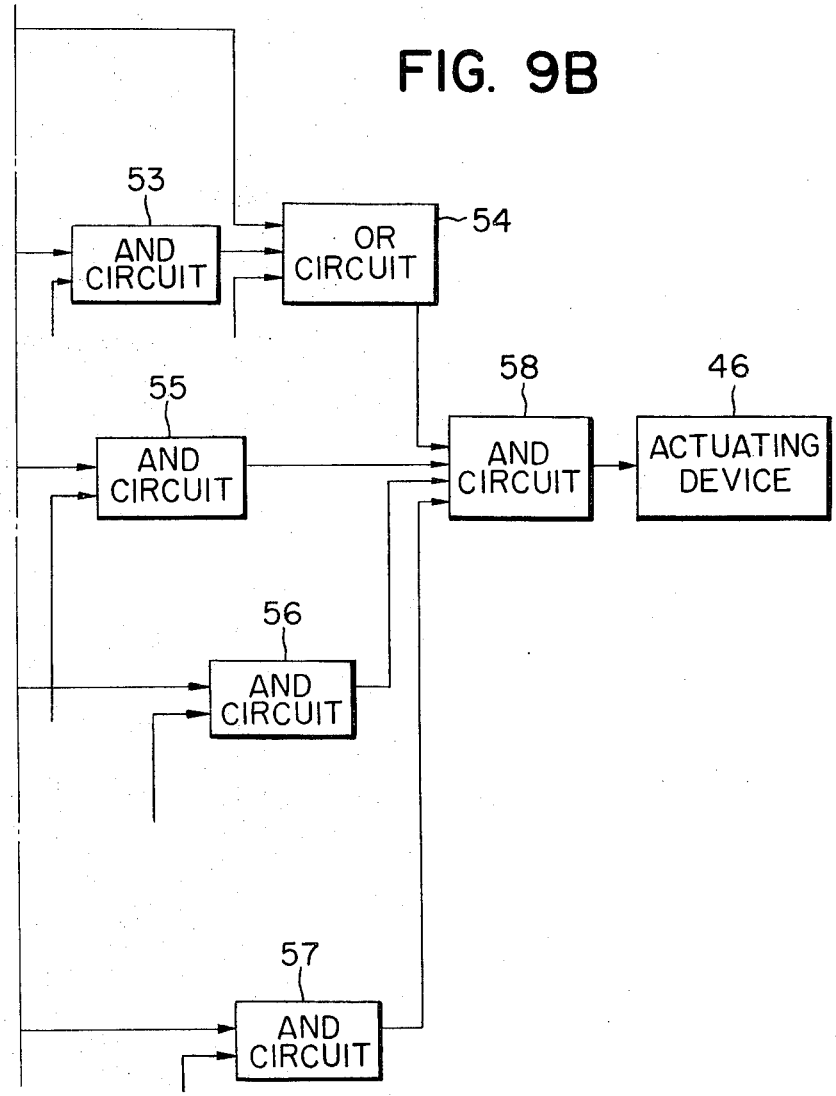

VEHICLE COLLISION ANTICIPATING DEVICE

BACKGROUND OF THE INVENTION

The present invention relates to a device for anticipating the collision of an automotive vehicle against an object by utilizing the wave radiated from the vehicle and reflected by the object, thereby actuating at the optimum time a passive restraint device, for example, a device for inflating a gas bag or the like before the collision takes place so as to surround a driver so that he may be protected from being directly hit against a front dashboard of the vehicle and being seriously injured.

In order to anticipate or detect the collision of a vehicle against an object or another vehicle, not only the relative velocity of the object with respect to the vehicle but also the distance between the object and the vehicle must be measured. However, the ordinary distance measuring apparatus such as radar systems using electromagnetic waves can neither measure the relative velocity of the object nor the distance between the object and the vehicle with a required degree of accuracy, especially when the object is very close to the vehicle, for example, one to two meters from the vehicle, so that the ordinary distance measuring apparatus cannot be used in the collision anticipating device whose reliability in operation must be very high. In order to detect an object with an extremely higher degree of accuracy, the frequency deviation of the ordinary FM-CW radar system must be higher than 100 MHz so that various technical problems arise. When the frequency deviation is reduced, the system becomes very complex in construction because the fixed error must be minimized. In case of pulse radar systems, the rise time of the pulse must be less than a few nanoseconds, so that various difficult technical problems also arise. The collision anticipating device must also detect whether an object is moving toward or away from a vehicle. The prior art device for detecting the direction of an object from the phase difference between two signals at two different points spaced apart from each other by 90° is complex in construction and expensive to manufacture.

SUMMARY OF THE INVENTION

The present invention was made to overcome the above and other related problems and defects encountered in the prior art collision anticipating devices for vehicles. According to the present invention, the collision anticipating device provides a the collision signal only when the collision of the vehicle against the object is unavoidable, by detecting that an object comes into the detection range defined by the beams of the transmitting and receiving antennas, and by detecting a time left for the vehicle before it collides against the object. In response to the collision signal, a safeguarding device is actuated to prevent a secondary collision in which a driver is suddenly pushed forward by inertia and hit against the front dashboard or window of the vehicle. When the angle between the direction of travel of the vehicle and that of the moving object is large, i.e., when the moving object is just passing across the path of the vehicle, or when the vehicle is passing the object so that there is no fear that the collision takes place, the safeguarding device will not be actuated. (In this specification, the operation of the safeguarding device when it is not needed will be referred to as the "inadvertent operation"). Thus the present invention provides a very reliable collision anticipating device which anticipates the collision from the time left for a vehicle before it collides against an object, thereby actuating the safeguarding device at the optimum time under various conditions.

One of the objects of the present invention is therefore to provide a collision anticipating device, for use with a device for protecting a driver in case of collision, which is simple in construction and highly reliable in operation and which provides the collision signal by detecting that an object comes into the detection range defined by the beams, and by detecting the time left for a vehicle before it collides against the object (this time will be referred to as the "collision time" hereinafter in this specification) so that the protecting or safeguarding device can be actuated at the optimum time, and the inadvertent operation of the safeguarding device can be prevented, where the collision anticipating device is not influenced by the reflection factor or dimensions of an object. Also the inadvertent operation due to the fact that the same intensity ratio or the same phase difference represents two different distances to an object, or the inadvertent operation when there is no fear that the collision takes place because the vehicle is just passing the object can be positively prevented.

Another object of the present invention is to provide a collision anticipating device which detects the relative velocity of an object with respect to a vehicle so that the inadvertent operation of a safeguarding device may be prevented when the vehicle is traveling at too low a speed to cause injury to a driver, or when the vehicle is at rest or parked.

Still another object of the present invention is to provide a collision anticipating device which detects the direction of an object so that the inadvertent operation of the safeguarding device may be prevented when the vehicle is just passing the object or the object is passing across the path of the vehicle.

The measured relative velocity is sometimes less than a real relative velocity depending upon the position of an object with respect to a vehicle so that the safeguarding device may be actuated too late. Therefore, still another object of the present invention is to provide a collision anticipating device which may detect the distance to an object so that the collision signal may be generated regardless of the detected collision time when the distance to the object reaches a predetermined distance, thereby actuating the safeguarding device at the optimum time.

The above and other objects, features and advantages of the present invention will become more apparent from the following description of some preferred embodiments taken in conjunction with the accompanying drawings.

BRIEF DESCRIPTION OF THE DRAWINGS

FIG. 9A and FIG. 9B show a block diagram of a distance detecting unit used in the fifth embodiment of the present invention.

BRIEF DESCRIPTION OF THE INVENTION

Figure 1C:
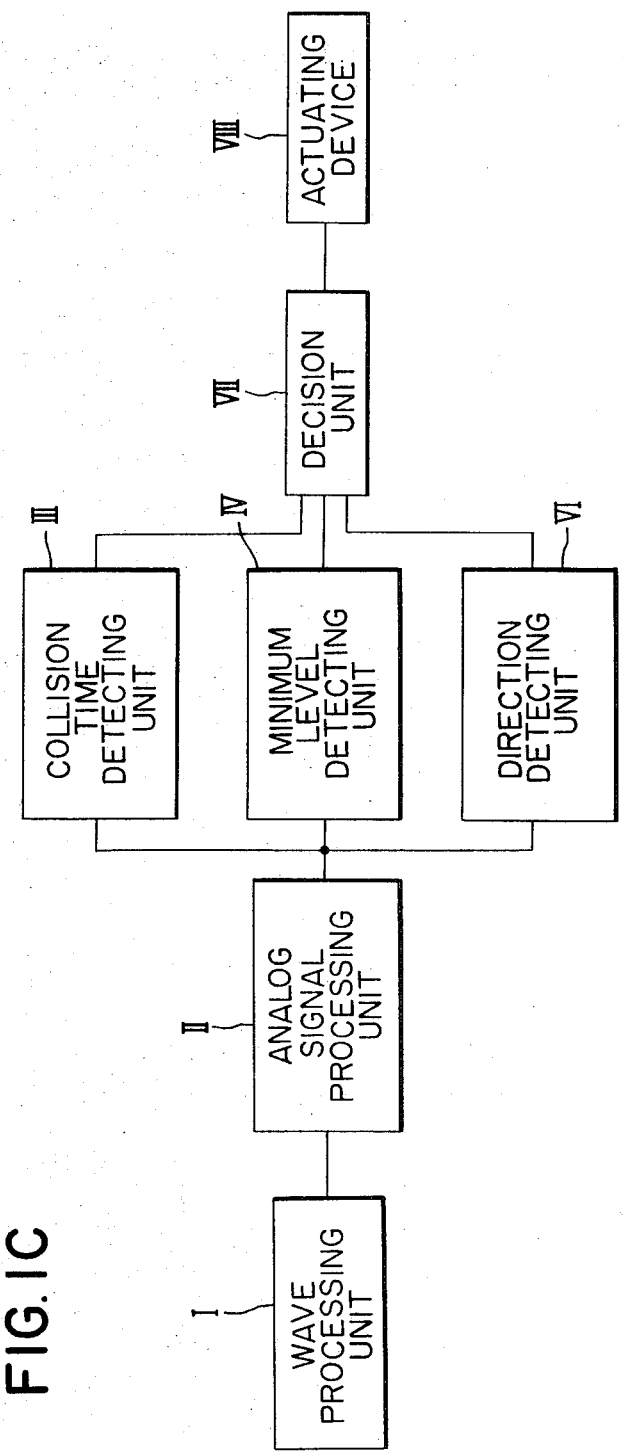
FIGS. 1(A), (B), (C), (D) and (E) are block diagrams of first to fifth embodiments of the present invention.
Figure 1D:
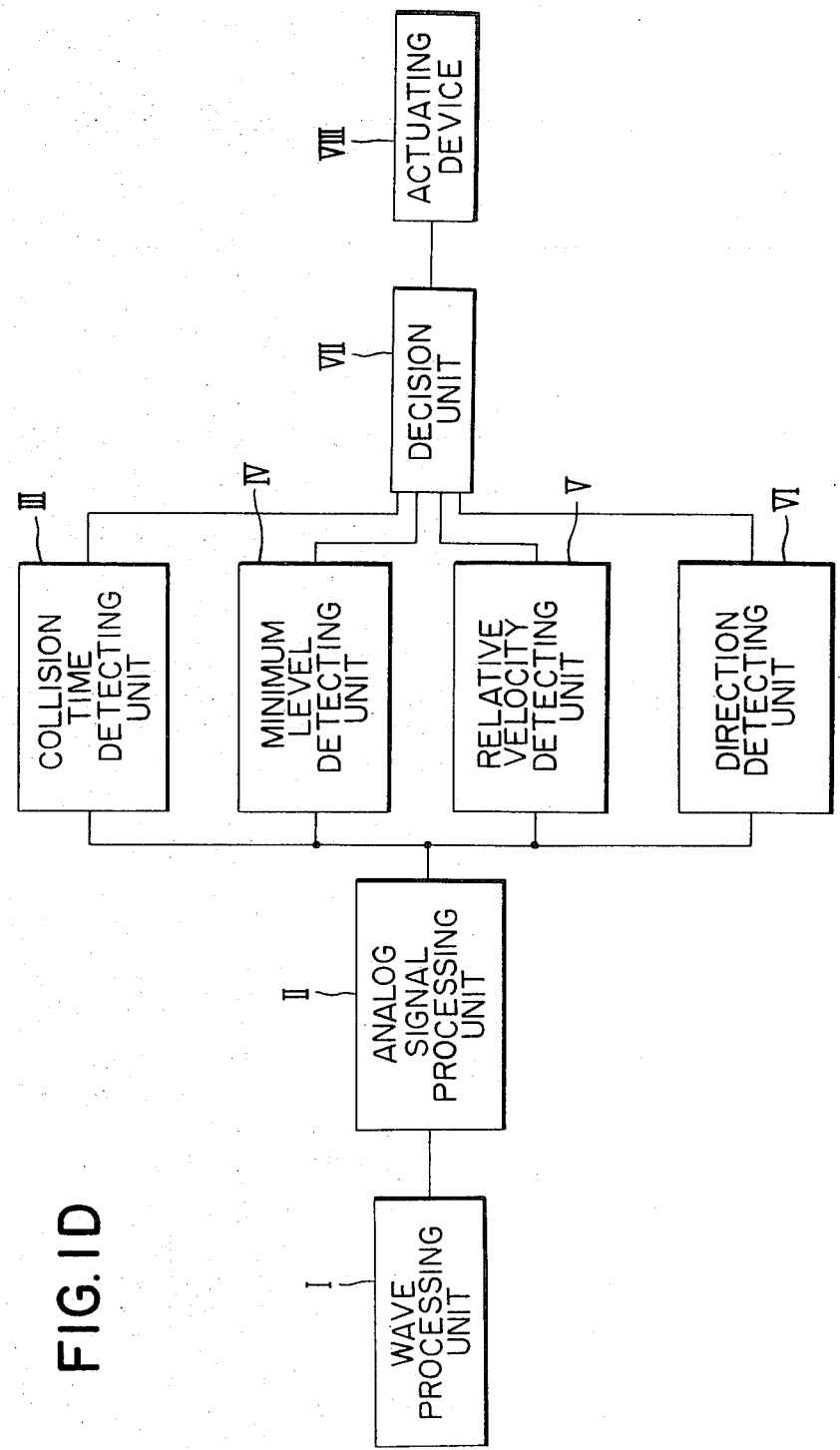

In order to facilitate the understanding of some preferred embodiments of the present invention, a general description thereof will be made.

A collision anticipating device in accordance with the present invention generally comprises a transmitting antenna for transmitting a wave; a receiving antenna for receiving the wave transmitted by said transmitting antenna and reflected by an object, said receiving antenna being so located that the beam axis of said receiving antenna may intersect that of said transmitting antenna in a predetermined range; a first circuit for generating signals based upon a wave obtained from the transmitted and received waves; a second circuit for deriving a signal when the intensity of the Doppler signal obtained from the wave which is derived by mixing the transmitted wave with the received wave, reaches a predetermined minimum level, so as to detect an object which comes into a predetermined range defined by the positions and angles of said transmitting and receiving antennas; a third circuit for deriving a signal when the collision time or the time left before a vehicle carrying said collision anticipating device collides against an object is less than a predetermined time; and a fourth circuit for deriving a signal only when said second and third circuits simultaneously provide output signals. (The device may comprise one or more of each of the above elements, and the same hereinafter.)

The second circuit detects whether or not an object comes into a predetermined intensity range defined by the positions and angles of the transmitting and receiving antennas, i.e., the transmitted and received beams; the third circuit detects whether the collision time is less than a predetermined time or not; and in response to the output signals of the second and third circuits, the fourth circuit provides an output signal, thereby actuating a device VIII for operating a safeguarding device at the optimum time. Thus, the device with these circuits can prevent the inadvertent operation of the safeguarding device when the vehicle is merely passing the object and enables the safeguarding device to actuate at the optimum time in a highly reliable manner.

A collision anticipating device in accordance with the present invention may further comprise, a fifth circuit for detecting the relative velocity of an object with respect to a vehicle and outputs a signal when said detected relative velocity reaches a predetermined velocity. The device further comprises a fifth circuit for detecting the relative velocity of an object with respect to a vehicle, and can more securely prevent the inadvertent operation of the safeguarding device. In other words, the safeguarding device is actuated only when the relative velocity is higher than a predetermined velocity, so that the safeguarding device must be actuated, while it will not be actuated, for example, when the vehicle is traveling at such a low speed that the driver is not seriously injured even when the vehicle collides against the object, or when the vehicle is being slowly parked between the vehicles in a parking area.

A collision anticipating device in accordance with the present invention may further comprise, a sixth circuit for detecting a direction of relative motion of an object with respect to a vehicle. The device further comprises a sixth circuit for detecting whether an object is moving toward or away from the vehicle, and can more securely prevent the inadvertent operation of the safeguarding device. In other words, the safeguarding device is not actuated when the object is moving away from the vehicle, that is, when the distance between the vehicle and the object is increasing, or when the object is merely passing across the path of the vehicle.

The device may further comprise both the fifth and sixth circuits, which device can serve to prevent the inadvertent operation of the safeguarding device more effectively when the vehicle is traveling at such a slow speed that the driver will not be seriously injured due to the secondary collision or when the vehicle is at rest or parked, as well as when the object is moving away from the vehicle, i.e., when the object is merely passing across the path of the vehicle or when the vehicle is passing the object so that a collision will not take place. Thus, the device further comprising the fifth and sixth circuits is more reliable in operation.

The device may further comprise, in addition to the above four circuits with or without the fifth and sixth circuits, a seventh circuit for detecting the distance between the object and vehicle and for generating a signal when said detected distance is less than a predetermined distance. The device further comprising the seventh circuit serves to actuate the safeguarding device at an earlier time when so required. Thus, the operation of the safeguarding device may become more reliable and dependable.

First Embodiment, FIGS. 1(A), 2, 3, 4, 5

The first embodiment of a collision anticipating device in accordance with the present invention generally comprises a pair of wave processing units I, a pair of analog signal processing units II, a pair of collision time detecting units III, a pair of minimum level detecting units IV and a decision unit VII.

The right and left units in each pair of units are the same in construction and function, so that description will be made only with respect to one of the right and left units for simplicity in this embodiment as shown in FIG. 1(A) and the following embodiments as shown in FIGS. 1(B) – 1(E).

The wave processing unit I includes a transmitting antenna for transmitting a wave and a receiving antenna for receiving the wave. The analog signal processing unit II corresponds to the first circuit for generating signals based upon a wave obtained from the transmitted and received waves. The collision time detecting unit III corresponds to the third circuit for deriving a signal by detecting the time left for a vehicle before it collides against an object. The minimum level detecting unit IV corresponds to the second circuit for deriving a signal when the intensity of the Doppler signal obtained from the wave which is derived by mixing the transmitted and received waves, reaches a predetermined minimum level, so as to detect an object which comes into a predetermined range defined by the positions and angles of the transmitting and receiving antennas. The decision unit VII corresponds to the fourth circuit for deriving a signal only when the collision time detecting unit III and the minimum level detecting unit IV simultaneously provide output signals.

More particularly, the output of the wave processing unit I is applied to the input of the analog signal processing unit II, the output of which is applied to both of the collision time detecting unit III and the minimum level detecting unit IV. The outputs of the units III and IV are applied to the input of the decision unit VII.

The transmitting antenna 9 radiates microwave energy having a carrier frequency of 10.525 GHz in a predetermined beam pattern, and the receiving antenna 10 receives the wave reflected by an object. The transmitting and receiving antennas 9 (9R, 9L) and 10 (10R, 10L) are mounted on a vehicle M as shown in FIGS. 2 and 5.

Figure 2:
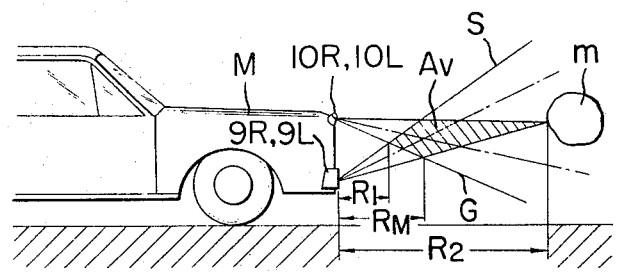
FIG. 2 is a schematic side view illustrating the transmitting and receiving antennas of the collision anticipating device mounted on a vehicle and the beams of the transmitting and receiving antennas which form the detection range.

FIG. 2 shows a schematic side view of a vehicle M on which the right and left transmitting antennas (9R, 9L) and receiving antennas (10R, 10L) are mounted, together with the beams of the right transmitting antenna 9R and the right receiving antenna 10R. The vertical beam pattern of the transmitting antenna 9R due to its vertical directivity is designated as S, whereas the vertical beam pattern of the receiving antenna 10R due to its vertical directivity is designated as G. As is well known in the art of the bistatic radar system, the intensity of the reflected wave is remarkably increased when the object is in the detection range $A_V$ (the hatched area in FIG. 2 and to be referred to as "the detection range" hereinafter) where the beams G and S intersect each other.

Figure 5:
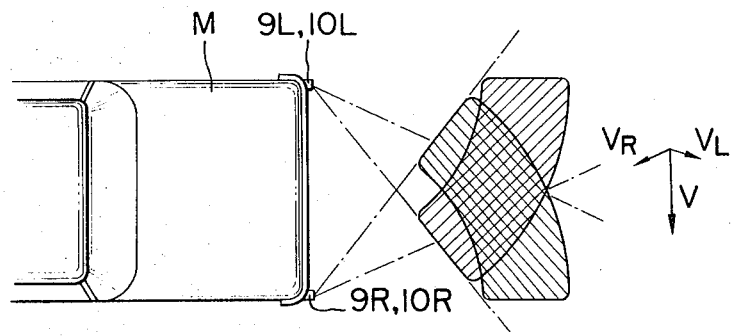
FIG. 5 is a schematic top view illustrating the detection range defined by the beams of the transmitting and receiving antennas.

FIG. 5 shows a schematic top view of the vehicle M on which the transmitting antennas (9R, 9L — not shown) and receiving antennas (10R, 10L) are so mounted that the beams thereof may overlap each other to form the detection range.

Figure 3:
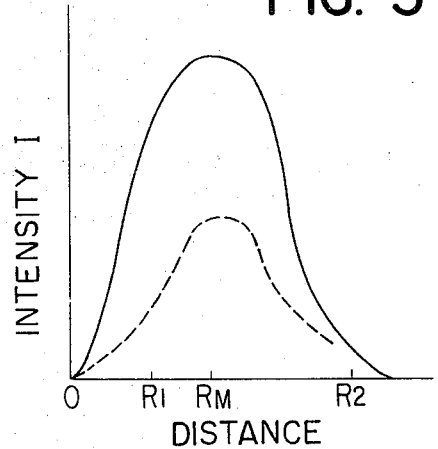
FIG. 3 is a graph illustrating the relation between the distance to an object within or near the detection range which is defined by the beams of the transmitting and receiving antennas and the intensity of the wave reflected by the object.

The intensity I of the reflected wave is shown in FIG. 3. The distance R from the top O of the transmitting or receiving antenna 9R (9L) or 10R (10L) is plotted along the abscissa, whereas the intensity of the wave reflected by the object $m$ at a distance R from the point O and received by the receiving antenna 10R (10L) is plotted along the ordinate. It is seen that when the object $m$ is farther than a distance $R_2$, the farthest point in the detection range from the vehicle, the intensity I of the received wave is almost equal to zero. As the object $m$ moves into the detection range and toward the vehicle M, the intensity I suddenly increases, and when it approaches the distance $R_M$ where the beam axes of the transmitting and receiving antennas intersect, the intensity I becomes maximum. Then the intensity is reduced, and when the object $m$ comes within the distance $R_1$ in the detection range, the nearest point to the vehicle, the intensity is sudenly reduced. In FIG. 3, the broken curve shows the intensity when the reflection factor of the object $m$ is relatively small. It is apparent that the patterns of the characteristic curves are similar independently of the reflection factors of the objects, especially at the distance $R_2$ in the detection range. Therefore, it is possible to detect the object $m$ at the distance $R_2$ with a tolerable degree of accuracy from the intensity I. The operation of the minimum level detecting unit IV is based upon this principle, and it is so arranged that it provides an output signal when the intensity of the received wave reaches a predetermined minimum level, that is, when the distance to the object $m$ is less than $R_2$.

The analog signal processing unit II processes the output of the wave processing unit I based upon a principle to be described in more detail hereinafter and provides an output signal to the collision time detecting unit III and the minimum level detecting unit IV.

Next the principles of detecting the distance to the object $m$ and the relative velocity of the object with respect to the vehicle used in the analog signal processing unit II in the embodiments of the present invention will be described.

The wave which is modulated in frequency by the sinusoidal wave is transmitted toward the object $m$, and a part of the transmitted wave and the wave reflected by the object and received by the receiving antenna 10 are mixed in order to derive the low frequency wave given by $$e = r \cos \left\{ \omega_c \Delta t + 2m_f \sin \frac{\omega_m \Delta t}{2} \cos \left( \omega_m t + \frac{\omega_m \Delta t}{2} \right) \right\}$$

$$= r \cos \omega_c \Delta t \left\{ J_0(m_r) + 2 \sum_{n=0}^{\infty} (-1)^n \cos 2n \left( \omega_m t + \frac{\omega_m \Delta t}{2} \right) \cdot J_{2n}(m_r) \right\} - r \sin \omega_c \Delta t \left[ 2 \sum_{n=0}^{\infty} (-1)^n \cdot \cos \left\{ (2n+1) \cdot \left( \omega_m t + \frac{\omega_m \Delta t}{2} \right) \right\} J_{2n+1}(m_r) \right] \quad (1)$$

where
$r$ = coefficient given depending upon the reflection factor of an object, the characteristics of the mixer and the like;
$107_c$ = angular frequency of a carrier wave;
$\Delta t$ = time interval between the time a wave is transmitted and the time the wave reflected is received;
$mf$ = frequency modulation index;
$\omega_m$ = angular frequency of modulated wave; and
$J_{2n}$ = Bessel function of $2n$ order of the first kind;
$m_f = 2\pi \Delta f / \omega_m$ and
$m_r = 2mf \sin \omega_m \Delta t / 2$ \quad (2)

where $\Delta t = 2R/C$ \quad (3)

where $R$ : distance to an object
$C$ : velocity of radiation wave, and
$\Delta f$ : frequency deviation.

The a-c signal voltage $e$ given by Eq. (1) is the sum of the frequency components such as a Doppler signal component, a fundamental wave component and harmonic components given by $rJ_0(m_r) \cos \omega_c \Delta t$,
$-2rJ_1(m_r) \cos (\omega_m t + \omega_m \Delta t/2) \sin \omega_c \Delta t$,
$-2rJ_2(m_r) \cos (2\omega_m t + \omega_m \Delta t) \cos \omega_c \Delta t$, When an object is moving at a constant relative velocity $v$ with respect to a vehicle, the first and second terms, $rJ_0(m_r) \cos \omega_c \Delta t$
and $-2rJ_1(m_r) \cos(\omega_m t + \omega_m \Delta t/2) \sin \omega_c \Delta t$ become $$rJ_0(m_r) \cos \omega_d t$$

and $-2rJ_1(m_r) \cos(\omega_m t + \omega_m \Delta t/2) \sin \omega_d t$, respectively, where $\omega_d$ = Doppler angular frequency, $2_v/C \; \omega_c$ (4)

Figure 4:
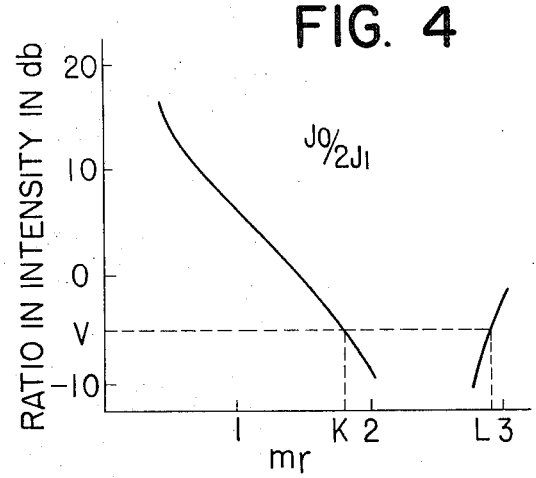
FIG. 4 is a graph illustrating the relation between the distance to an object and the ratio in intensity between frequency components of the output signal of a mixer in the collision anticipating device.

The first term represents the Doppler signal component, and the second term also represents a further Doppler signal component, $-2rJ_1(m_r) \sin \omega_d t$, when demodulated. The ratio in intensity between the maximum values of the first and second terms is given by $J_0(m_r)/2J_1(m_r)$ which is a function of $m_r$, that is, a distance to the object as shown in FIG. 4.

However, $m_r$ may have two values at the same ratio in intensity. For example, when the intensity ratio is $V$, $m_r$ has two values $K$ and $L$ as shown in FIG. 4. As a result, the inadvertent operation tends to occur. That is, the object at a distance $K$ in terms of $m_r$ may be taken as being at a distance $L$ in terms of $m_r$, and vice versa. However, according to the present invention, the transmitting and receiving antennas are so mounted on the vehicle M that the object $m$ within the distance $R_2$ may be detected with accuracy from the intensity of the reflected wave. Therefore, the frequency deviation $\Delta f$ is so determined that the distance to an object may be determined uniquely from the intensity ratio. Thus the distance to an object may be correctly detected from the ratio in intensity between the first and second terms.

Next, the relative velocity of the object with respect to the vehicle M may be obtained from the Doppler amgular frequency $\omega_d$, as in the ordinary radar systems. As shown in Eq. (4), the Doppler angular frequency $\omega_d$ is in proportion to the relative velocity $v$ so that there may be employed a system in which the analog output in proportion to the directly measured Doppler angular frequency $\omega_d$ is derived, or a system in which the Doppler angular frequency $\omega_d$ is converted into a voltage representing the Doppler angular frequency $\omega_d$ and hence the relative velocity $v$.

In response to the output signal from the analog signal processing unit II, the collision time detecting unit III detects whether or not the collision time, which is determined from the distance between an object and a vehicle and the relative velocity of the object with respect to the vehicle, and which is the time required for the vehicle to collide against the object, is less than a predetermined time. It should be noted in the instant embodiment the collision time is not always calculated, but only whether the collision time is less than a predetermined time or not is detected.

Next the general mode of operation of the first embodiment will be described. The wave is transmitted from the transmitting antenna 9 in the wave processing unit I when the vehicle M is moving, and the wave reflected by the object is received by the receiving antenna 10 and processed by the analog signal processing unit II based upon the principle described above so that the output thereof is fed to the collision time detecting unit III and to the minimum level detecting unit IV. When the object $m$ comes into the detection range described hereinbefore, the minimum level detecting unit IV provides an output signal. The collision time detecting unit III provides an output signal when the collision time is less than a predetermined time in response to the signal from the analog signal processing unit II.

When the output signals of the units III and IV are simultaneously applied to the decision unit VII, the latter provides an output signal so that a device VIII for actuating a safeguarding device may be actuated, thereby protecting the driver as well as the passengers in case of collision.

In the first embodiment of the present invenntion, the right and left transmitting and receiving antennas 9 and 10 are so mounted on the vehicle M that the beams of the transmitting and receiving antennas 9 and 10 may define the detection range as shown in FIGS. 2 and 5. Therefore, the intensity of the wave reflected by an object off the course of the vehicle and received by only one of the receiving antennas 10 is remarkably small, so that the minimum level detecting unit IV will not provide an output signal when an object is merely passing off the course of the vehicle. Thus the inadvertent operation of the safeguarding device may be effectively prevented. The minimum level detecting unit IV detects whether or not the intensity of the wave reflected by an object is in excess of a predetermined level at the distance $R_2$ in the detection range, the farthest point from the vehicle, regardless of the dimensions and reflection factor of an object, so that there is no fear that the safeguarding device will or will not be actuated depending upon the dimensions and reflection factor of theo object. In other words, as soon as an object comes into the detection range, the minimum level detecting unit IV provides an output signal independently of the dimensions and reflection factor of an object. In the radar system employed in the instant embodiment, the same intensity ratio gives two different distances to an object as described in detail with reference to FIG. 4 so that the object having a large reflection factor and positioned at a long distance away from the vehicle may be mistaken as being located at a relatively short distance from the vehicle. However, in the present invention, because of the above-mentioned arrangements of the transmitting and receiving antennas and because of the function of the minimum level detecting unit IV, the inadvertent operation of the safeguarding device will be prevented. The same is true even when the present invention is applied to the other radar system such as the AM or two-frequency radar system.

Further, in the instant embodiment, the time left for the vehicle before it collides against the object is not calculated, but only whether the collision time is less than a predetermined time or not is detected, so that the object may be detected about 100 msec. before the vehicle collides against it, and the safeguarding device may be actuated at the optimum time, and when the collision time is in excess of 100 msec., the safeguarding device will never be actuated. Thus the function of the first embodiment is substantially similar to the prior art system in which the distance to an object or the collision time is alway measured, but the first embodiment is simpler, in that it uses an electronic circuit, more reliable and dependable in operation and more inexpensive in manufacure.

Second Embodiment, FIG. I(B)

The second embodiment of the present invention is similar to the first embodiment except that a relative velocity detecting unit V is inserted between the analog signal processing unit II and decision unit VII in parallel with the collision time detecting unit III and the minimum level detecting unit IV.

In the relative velocity detecting unit V, the Doppler angular frequency $\omega_d$, which is proportional to the relative velocity $v$ as described with reference to Eq. (4), is directly converted into a voltage in an analog manner and is compared in a comparator with a reference voltage so that the relative velocity detecting unit will provide an output signal only when the relative velocity is in excess of 30 Km/h. In the second embodiment, therefore, only when the collision time detecting unit III, the minimum level detecting unit IV and the relative velocity detecting unit V simultaneously provide an output signals to the decision unit VII, the latter providing an output signal to actuate the actuating device VIII.

In addition to the features of the first embodiment, the second embodiment has an important feature that it will not provide the collision output signal when the relative velocity is less than a predetermined low speed such as 30 Km/h or when the vehicle is at rest or parked, so that the driver will not be injured seriously even when the vehicle collides against the object. Since the second embodiment will not provide the collision output signal when the relative velocity is less than 30 Km/h, the frequency band of the signal to be processed in the relative velocity detecting unit V may be narrow. As a result, the electronic circuitry may be simpler in construction, more reliable in operation and less expensive to manufacture.

Third Embodiment, FIG. 1(C)

The third embodiment of the present invention is substantially similar to the first embodiment except that a direction detecting unit VI is additionally inserted between the analog signal processing unit II and the decision unit VII.

The direction detecting unit VI is based on the principle that the Doppler signals contained in the first and second terms of Eq. (1) are different in phase by 90° in the positive and negative directions and the Doppler signal of the first term advances before or lags behind the Doppler signal of the second term by 90° depending upon whether an object is closing or receding with respect to the vehicle. In the present embodiment, the direction detecting unit VI provides an output signal only when an object is moving toward a vehicle.

In addition to the features of the first embodiment, the third embodiment has an important feature that the inadvertent operation of the safeguarding device is prevented when an object is receding. When an object passes across the path of the vehicle at a relative velocity $v$, for example, in the direction as shown in FIG. 5, the right device detects the closing object with a relative velocity $v_R$, whereas the left device detects the receding object with a relative velocity $v_L$, and vice versa in the opposite direction. Thus, the comparator either in the right or left device will not generate a signal, so that the inadvertent operation of the safeguarding device may be prevented. Moreover, when the vehicle is passing past an object neither of the right and left devices will provide an output signal so that the inadvertent operation may be prevented. Thus the third embodiment can more positively prevent the inadvertent opertion than the first embodiment.

Fourth Embodiment, FIGS. 1(D) and 2 – 8

The fourth embodiment generally comprises the wave processing unit I, the analog signal processing unit II, the collision time detecting unit III, the minimum level detecting unit IV, the relative velocity detecting unit V, the direction detecting unit VI and the decision unit VII. Since the fourth embodiment includes all of the units I–VII of the present invention, each unit will be described in more detail hereinafter.

Wave Processing Unit I, FIGS. 6A to 6E

The wave processing unit I generally comprises the transmitting and receiving antennas 9 and 10, a coupler 11, a microwave modulator 12, a microwave oscillator 13, a first mixer 14 and a sine wave generator 15.

The arrangement and operations of the transmitting and receiving antennas 9 and 10 are described in detail hereinbefore so that no further description will be made. The sine wave generator 15, which determines the FM frequency of the microwave, has output terminals connected to the input terminals of the microwave modulator 12 and a second mixer 18 in the analog signal processing unit II to be described hereinafter. The microwave modulator 12 which frequency-modulates the microwave with a frequency deviation $\Delta f$ has the output terminal connected to the input terminal of an oscillator 13 for radiating microwave energy with a sufficient output level. The output terminal of oscillator 13 is connected to one of the input terinals of the coupler 11. The other input terminal of the coupler 11 is connected to the receiving antenna 10, whereas the output terminals thereof are connected to the transmitting antenna 9 and the first mixer 14, respectively. The coupler 11 functions to transmit the microwave energy to the transmitting antenna 9, and a portion of the transmitted wave to the first mixer 14, and to isolate the coupling between the transmitting and receiving antennas 9 and 10, so that the received wave is transmitted from the receiving antenna 10 to the first mixer 14. The first mixer 14 mixes the received wave with a portion of the transmitted wave to give the low frequency wave or difference frequency signal.

Analog Signal Processing Unit II, FIGS. 6A to 6E

The analog signal processing unit II generally comprises a wideband amplifier 16, a bandpass filter 17, a second mixer 18, a bandpass filter 19, AC - DC converters 20 and 21 and wave shaping circuits 22 and 23.

The wideband amplifier 16 has an input terminal connected to the output terminal of the first mixer 14 in the wave processing unit I and the output terminal connected to the input terminals of the bandpass filter 17 and the second mixer 18. The function of the wideband amplifier 16 is to amplify the output signal of the first mixer 14 without distortion. The bandpass filter 17 has the output terminal connected to the input terminals of the AC - DC converter 20 and the wave shaping circuit 22. The function of the bandpass filter 17 is to pass only the Doppler component. The function of the AC - DC converter 20 is to convert the Doppler signal derived from the bandpass filter 17 into a DC signal. The function of the wave shaping circuit 22 is to shape the Doppler signal into a rectangular waveform having a period equal to that of the Doppler signal component derived from the bandpass filter 17.

The second mixer 18 has the input terminals connected to the output terminals of the sine wave generator 15 and the wideband amplifier 16, and the output terminal connected to the input terminal of the bandpass filter 19, and mixes the output signal of the wideband amplifier 16 with the frequency modulating signal from the sine wave generator 15 to provide a signal in which the Doppler signal component is superposed upon a wave having the frequency higher than the modulation frequency. The bandpass filter 19, the AC - DC converter 21 and the wave shaping circuit 23 are similar in construction and function to the above bandpass filter 17, the AC - DC converter 20 and the wave shaping circuit 22, respectively. The bandpass filter 19 passes only the Doppler signal component, and the AC - DC converter 21 converts the Doppler signal derived from the bandpass filter 19 into a DC signal. The wave shaping circuit 23 converts the output signal derived from the bandpass filter 19 into a rectangular waveform whose period is equal to that of the Doppler signal component derived from the bandpass filter 19.

Collision Time Detecting Unit III

The collisionn time detecting unit obtains the collision time by dividing the distance between the vehicle and object by the relative velocity with the following construction in this embodiment.

The collision time detecting unit III generally comprises a multiplier 35 and a comparator 36. The multiplier 35 has one of its input terminals connected to the output terminal of the AC - DC converter 21 in the analog signal processing unit II and the other input terminal to the output terminal of a register 29 to be described hereinafter in the relative velocity detecting unit V, and has its output terminal connected to one input terminal of the comparator 36. The multiplier 35 multiplies the output of the AC - DC converter 21 with the output of the register 29. The comparator 36 has the other input terminal connected to the output terminal of the AC - DC converter 20, and compares the output of the multiplier 35 with the output of the AC - DC converter 20 so that only when the output voltage of the AC - DC converter 20 is higher than that of the multiplier 35, does the comparator 36 provides an output signal. For example, the comparator 36 provides an output signal when the collision time is less than about 100 – 70 msec.

Minimum Level Detecting Unit IV

The minimum level detecting unit IV generally comprises a comparator 37 and a reference voltage source 38. The reference voltage source 38 supplies a reference voltage to one of the input terminals of the comparator 37, whereas the output signal of the AC - DC converter 21 in the analog signal processing unit II is fed to the other input terminal thereof. The comparator 37 compares the output signal voltage of the AC - DC converter 21 with the reference voltage so that only when the former is higher than the latter, does the comparator provides an output signal.

Relative Velocity Detecting Unit V

The relative velocity detecting unit V generally comprises a counter 24, an RS flip-flop 25, a clock pulse generator 26, an AND circuit 27, a counter 28, a register 29, an OR circuit 30, delay circuits 31 and 32, a D - A converter 33, a reference voltage source 47 and a comparator 34.

The counter 24 has one of the input terminals connected to the output terminal of the wave shaping circuit 23 in the analog signal processing unit II, and has one of the output terminals connected to one of the input terminals of the OR circuit 30, and the other output terminal connected to one of the input terminals of the RS flip-flop 25. The counter 24 counts the pulses from the wave shaping circuit 23. The OR circuit 30 has its other input terminal connected to one of the output terminals of the counter 28, and has an output terminal connected to the input terminal of the delay circuit 31 and to the other input terminal of the RS flip-flop 25. The OR circuit 30 provides the logic sum of the output signal generated from the counter 24 when it counts 15 pulses, and the output signal generated from the counter 28 when it counts 14 pulses. The delay circuit 31 has an output terinal connected to the input terminal of the delay circuit 32 whose output terminal is connected to the other input terminal of the counter 24 and one of the input terminals of the counter 28. The output terminal of the delay circuit 31 is also connected to one of the input terminals of the register 29 and to one of the input terminals of an integrator 41 to be described hereinafter. The delay circuit 31 functions to delay the output signal of the OR circuit 30. The delay circuit 32 further delays the output signal of the delay circuit 31.

The RS flip-flop 25 has an output terminal connected to one of the input terminals of the AND circuit 27, and is set when the counter 24 counts one pulse, and continues to provides an output signal until the reset signal is applied. The clock pulse generator 26 is connected to the other input terminal of the AND circuit 27, and generates a rectangular waveform signal or pulse of 500 Hz. The AND circuit 27 has an output terminal connected to the other input terminal of the counter 28, and provides the logic product of the output signals of the RS flip-flop 25 and the clock pulse generator 26. The counter 28 has the other output terminal connected to the other input terminal of the register 29, and counts the pulses fed from the AND circuit 27.

The register 29 has an output terminal connected to the input terminal of the D - A converter 33, and functions to hold the output signal from the counter 28 until the shift signal is applied. The D - A converter 33 has an output terminal connected to one of the input terminals of the comparator 34, and functions to convert the digital signal fed from the register 29 into an analog signal. The reference voltage source 47 is connected to the other input terminal of the comparator 34, and feeds a reference voltage thereto. The comparator 34 compares the output voltage of the D - A converter 33 with the reference voltage supplied from the reference voltage source 47 so that only when the voltage of the former is higher than that of the latter, does the comparator 34 provides an output signal to the decision unit VII.

Direction Detecting Unit VI

The direction detecting unit VI generally comprises a D-type flip-flop 39, the monostable multivibrator 40, an integrator 41, a reference voltage source 43 and a comparator 42. The D-type flip-flop 39 has clock and D input terminals connected to the output terminals of the wave shaping circuits 22 and 23, respectively, and has an output terminal connected to the input terminal of the monostable multivibrator 40. The monostable multivibrator 40 whose output terminal is connected to the other input terminal of the integrator 41 is triggered in response to the output pulse from the D-type flip-flop 39 for generating pulses with a predetermined pulse width. The integrator 41 whose output terminal is connected to one of the input terminals of the comparator 42 integrates the output signal from the monostable multivibrator 40 and holds the integrated signal until the reset signal is applied. The reference voltage source 43 is connected to the other input terminal of the comparator 42. The comparator 42 compares the output signal voltage of the integrator 41 with the reference voltage supplied from the reference voltage source 43 so that only when the voltage of the former is higher than that of the latter, does the comparator 42 provides an output signal to the decision unit VII.

Decision Unit VII

The decision unit VII generally comprises right and left AND circuits 44 and an AND circuit 45, four input terminals of the former being connected to the output terminals of the comparators 36, 37, 34 and 42 in the collision time detecting unit III, the minimum level detecting unit IV, the relative velocity detecting unit V and the direction detecting unit VI, respectively, so that the AND circuit 45 generates the collision signal to actuate the device 46 only when the output signals of these comparators are simultaneously applied to the AND circuits 44.

Figure 7:
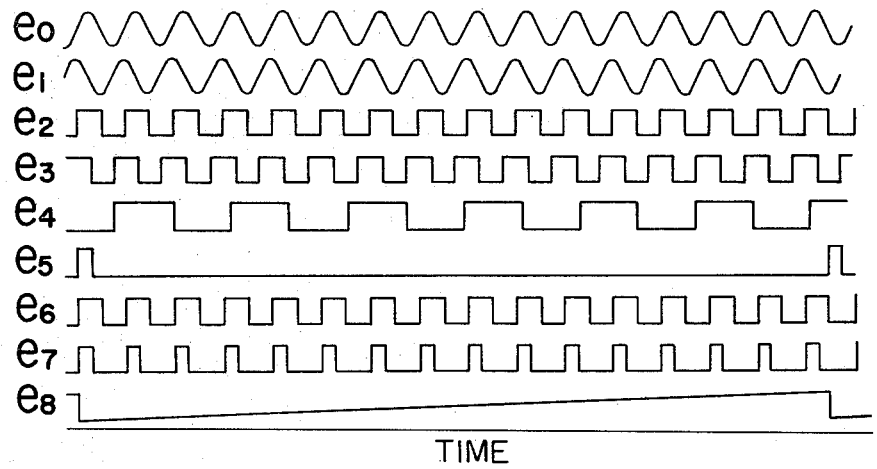
FIG. 7 illustrates the waveforms of the signals obtained at various points of the block diagram shown in FIG. 6.

Operation, FIGS. 6 and 7

Next the mode of opertion of the fourth embodiment will be described with reference to FIGS. 6 and 7, the latter illustrating the waveforms of the signals obtained at various points in the block diagtam shown in FIG. 6.

Wave Processing Unit I

The wave which is frequency-modulated by the modulator 12 is radiated toward an object by the transmitting antenna 9, and the wave reflected by an object is received by the receiving antenna 10 and fed into the first mixer 14. The first mixer mixes the received wave with a portion of the transmitted wave and provides an output signal to the wideband amplifier 16 in the analog signal precessing unit II.

Analog Signal Processing Unit II

The signal from the first mixer 14 is amplified by the wideband amplifier 16. The output signal of the wideband amplifier 16 is the signal given by Eq. (1) in which the Doppler signal component, the fundamental wave component and the harmonic components are superposed one upon another. The bandpass filter 17 passes only the Doppler signal component as shown in FIG. 7 at $e_0$. The second mixer 18 mixes the output signal of the wideband amplifier 16 with the output signal of the sine wave genirator 15 in the wave processing unit I to provide an output signal in which the Doppler signal component, contained in the second term of Eq. (1), the fundamental wave component and the harmonic components are superposed one upon another. the bandpass filter 19 only passes the Doppler signal component as shown in FIG. 7 at $e_1$. Thus, the maximums of the output signals of the bandpass filters 17 and 19 are proportional to $rJ_0(m_r)$ and $2rJ_1(m_r)$ as is clear from Eq. (1).

The AC - DC converters 20 and 21 convert the output signals from the bandpass filters 17 and 19 into the corresponding DC voltage signals. The wave shaping circuits 22 and 23 shape the reactangular wavefrom signals or pulses whose periods are equal to those of the output signals from the bandpass filters 17 and 19 and whose pulse widths and amplitudes are constant as shown in FIG. 7 at $e_2$ and $e_3$.

Relative Velocity Detecting Unit V

When the counter 24 is reset, it sets the RS flip-flop 25 when it counts one pulse from the wave shaping circuit 23, and provides an output signal when it counts 15 pulses. The output signal is fed into the OR circuit 30, delayed in time by the delay circuits 31 and 32 and applied to the reset terminal of the counter 24 so that the counter 24 is reset. The reset signal is also applied thereto when the counter 28 counts 14 pulses so that the counter 24 is reset. The above operation is cycled. The above circuit components constitute the so-called "decision time detecting circuit" which is reset every 15 waves of the Doppler signal.

The clock pulses from the clock pulse generator 26 are fed into the counter 28 through the AND circuit 27 only when the RS flip-flop 25 is set. When the counter 28 counts 14 pulses, it provides an output signal to the OR circuit 30. This output signal is fed to the reset terminal of the counter 28 after it is delayed in time by the delay circuits 31 and 32 so that the counter 28 is reset. The counter 28 is also reset when the counter 24 counts 15 pulses. When the output or shift signal is applied to the register 29 from the delay circuit 31, the register 29 reads and holds the output signal of the counter 28 and then transfers it to the D - A converter 33 and to the multiplier 35.

The output signal or pulse of the clock pulse generator 26 is shown at $e_4$ in FIG. 7, whereas the reset signal to be applied to the counter 28 is shown at $e_5$ in FIG. 7. The interval between the reset pulses $e_5$ becomes smaller as the relative velocity is higher, and vice versa. When the relative velocity is low, the interval between the reset pulses equals to 14 clock pulses. The number of output pulses from the register 29 equals to the number of clock pulses counted during the interval between the reset pulses so that it may become greater when the relative velocity is low, and vice versa.

The D - A converter 33 provides a DC output signal in inverse proportion to the number of output pulses from the register 29. The reference voltage supplied from the reference voltage source 47 is the DC output voltage corresponding to the relative velocity of 30 Km/h, so that the comparator 34 provides an output signal to the AND circuit 44 in the decision unit VII. only when the relative velocity is in excess of 30 Km/h.

Collision Time Detecting Unit III

Figure 8:
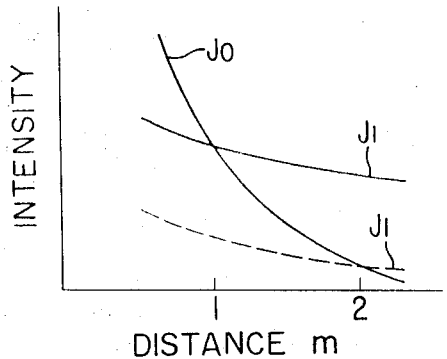
FIG. 8 is a graph used for the explanation of the principle of the operation of a multiplier used in the embodiments of the present invention.
Figure 6A:
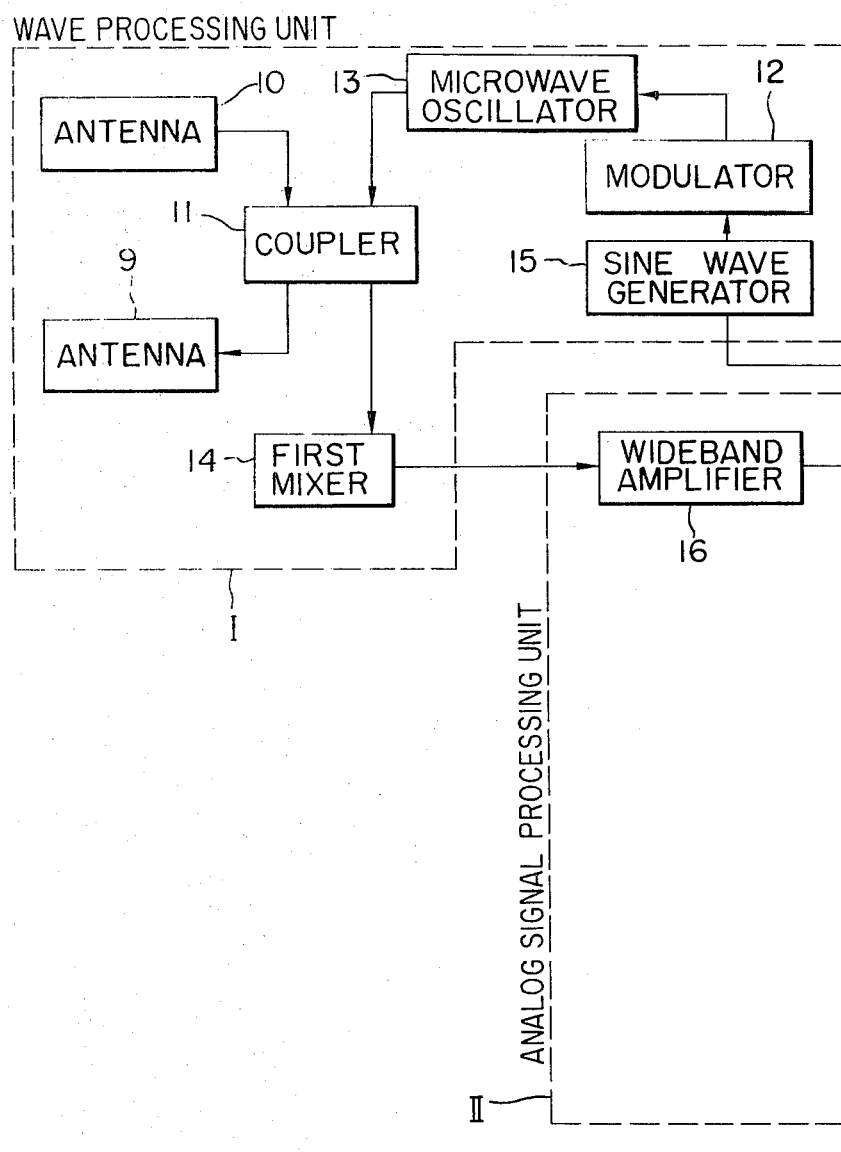
FIG. 6A to FIG. 6E show a block diagram of the fourth embodiment shown in FIG. 1(D)
Figure 6B:
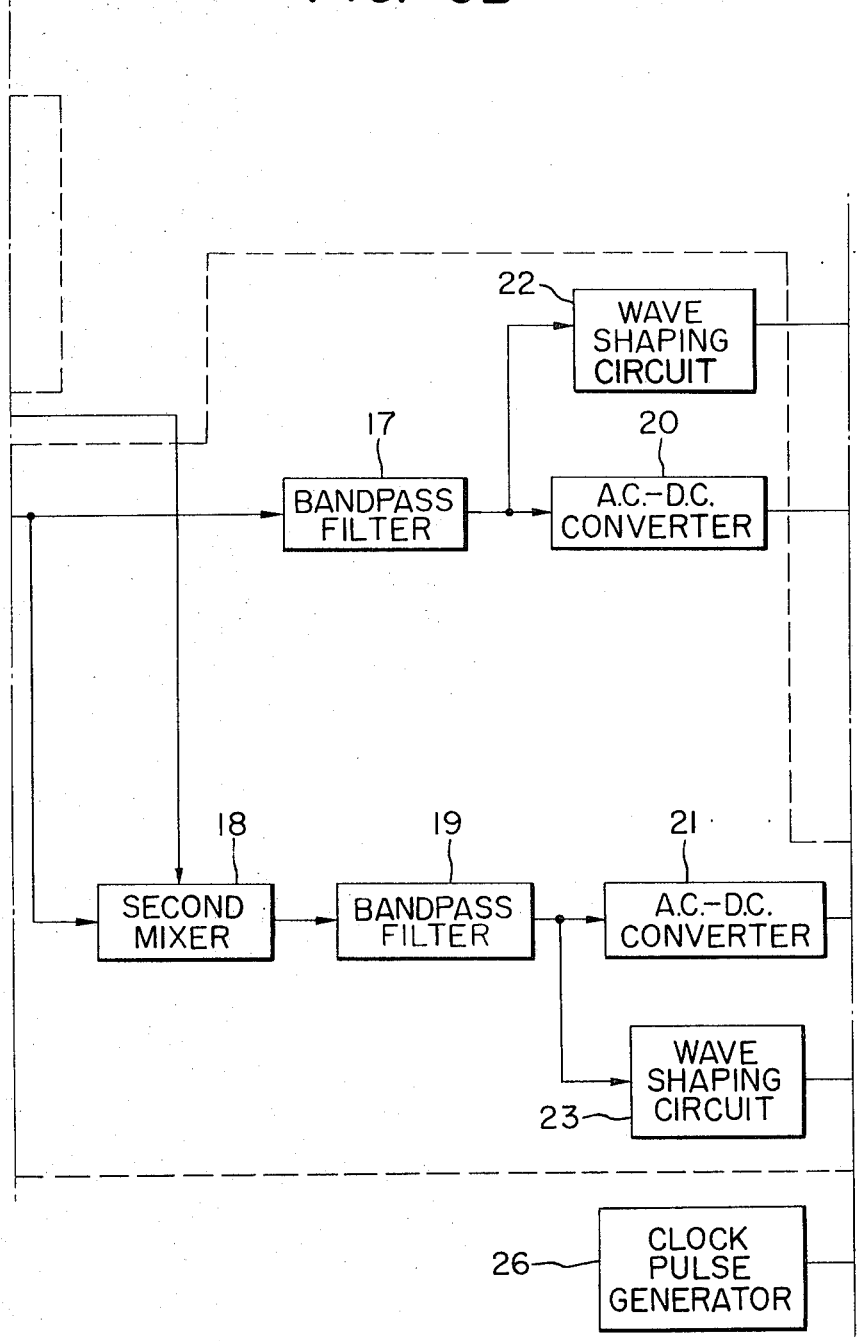
Figure 6C:
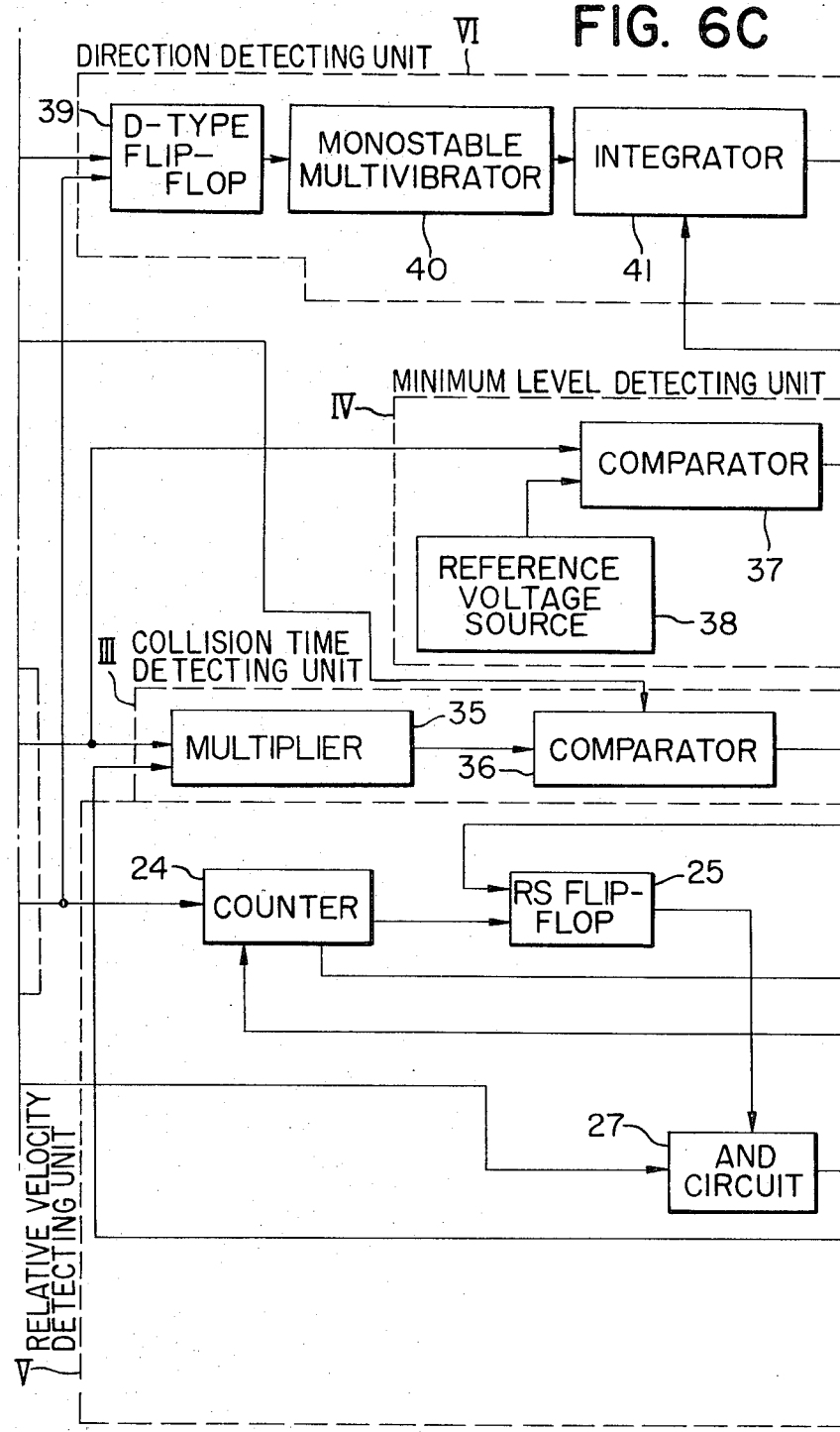
Figure 6D:
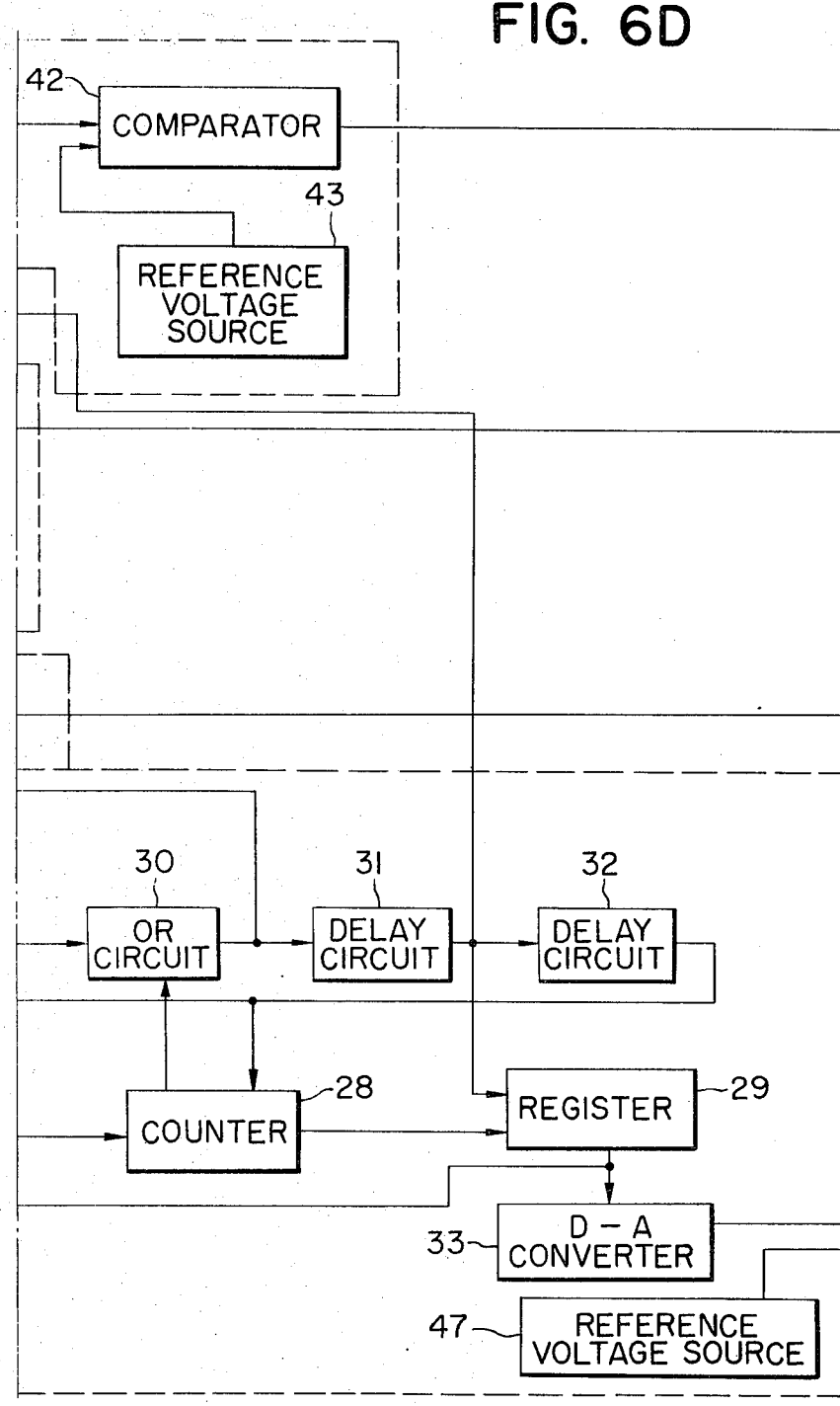
Figure 6E:
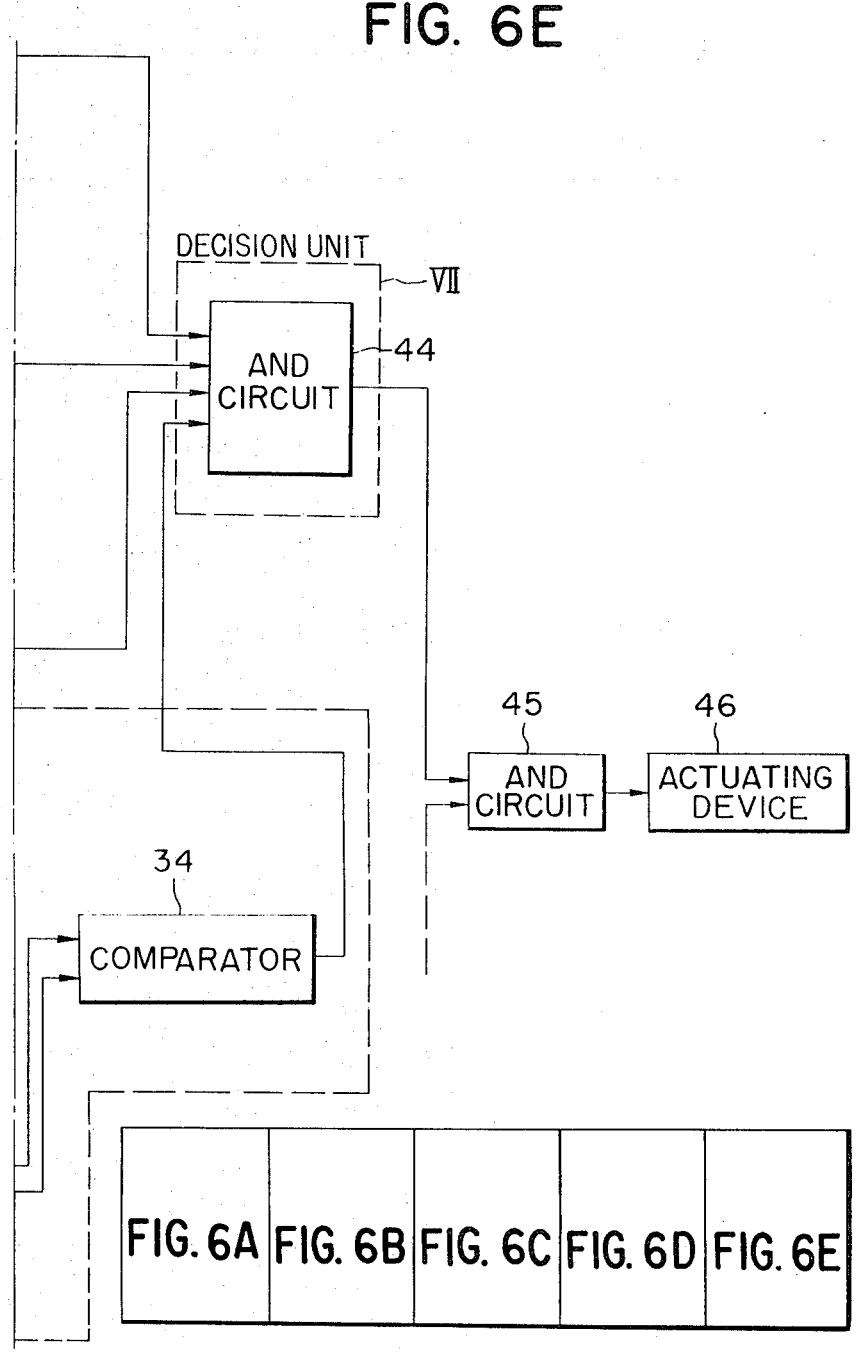

The output voltage fed from the AC - DC converter 21 in the analog signal processing unit II to the muliplier 35 is weighed by the number of output pulses of the register 29. The output characteristics of the multiplier 35 are shown in FIG. 8. The comparator 36 provides an output signal when the collision time is less than about 100 msec - 70 msec. More particularly the ratio between the outputs of the AC - DC converters 20 and 21 in the analog signal processing unit II is obtained from the distance between the vehicle and object as shown in FIG. 4, and the AC - DC converters 20 and 21 in the instant embodiment are so adjusted as to exhibit the distance-intensity curves as shown in FIG. 8. In FIG. 8, the distance is plotted along the abscissa whereas the intensity of the outputs of the AC - DC converters 20 and 21 along the ordinate, and $J_0$ denotes the output of the AC - DC converter 20 whereas $J_1$, the output of the AC - DC converter 21. The output at the lowest relative velocity (30 Km/h) that the device of the present invention is actuated as indicated by the solid line, whereas the output at the maximum relative velocity (100 Km/h), by the broken line. The multiplier 35 is used to control the intensity of $J_1$ in response to the relative velocity. When the relative velocity is 30 Km/h, the intensities of $J_0$ and $J_1$ are the same at a distance of one meter, and when the relative velocity is 100 Km/h, they become equal at a distance of two meters. The comparator 36 provides an output signal at a distance of one meter when the relative velocity is 30 Km/h and at a distance of two meters when the relative velocity is 100 Km/h. In other words, the comparator 36 provides an output signal when the collision time is less than about 100 msec. - 70 msec.

Minimum Level Detecting Unit IV

The comparator 37 compares the signal voltage of the AC - DC converter 21 in the analog signal processing unit II with the reference voltage supplied from the reference voltage source 38, so that the comparator 37 provides an output signal to the AND circuit 44 only when the voltage of the former is higher than that of the latter. The reference voltage is set to the voltage when the distance between an object and a vehicle is two meters so that the comparator 37 provides an output signal when the distance is less than about 2 meters.

Direction Detecting Unit VI

The output signal waveforms $e_2$ and $e_3$ of the wave shaping circuits 22 and 23 shown in FIG. 7 are those that result when an object is moving toward the vehicle, that is, when the distance between the vehicle and an object is decreasing. When an object is moving away from the vehicle, the waveform $e_3$ of the wave shaping circuit 23 is reversed. The output signals of the wave shaping circuits 22 and 23 are applied to the clock and D input terminals of the D-type flip-flop 39, respectively, so that the D-type flip-flop 39 provides an output signal with the waveform $e_6$ in FIG. 7. This output signal is applied to the monostable multivibrator 40 so that the rise time of the output pulses of the monostable multivibrator 40 coincides with that of the output pulses $e_6$ of the D-type flip-flop 39 as shown in FIG. 7 at $e_7$. The output pulses $e_7$ having a constant pulse width are applied to the integrator 41. The output signal voltage of the integrator 41 to be applied to the comparator 42 is in proportion to the number of output pulses of the monostable multivibrator 40 as shown in FIG. 7 at $e_8$. (In practice the output signal waveform $e_8$ is of a stepped form, but for the sake of simplicity the waveform $e_8$ is indicated by the straight line in FIG. 7). In response to the reset signal, the integrator 41 is cleared or reset and the above operation is cycled in the same manner. The reference voltage supplied from the reference voltage source 43 is set to the output voltage obtained when 12 input pulses are integrated by the integrator 41, so that the comparator 42 provides an output signal to the AND circuit 44 when more than 12 pulses are fed into the integrator 41.

When an object is moving away from the vehicle, the output signal voltage of the D-type flip-flop 39 is zero so that the comparator 42 will not provides an output signal to the AND circuit 44.

In summary, the direction detecting unit VI in accordance with the present invention provides an output signal only when an object is moving toward the vehicle, but will not provides an output signal when an object is moving away from the vehicle. Thus the direction detecting unit VI detects a direction of a relative movement of the object with respect to the vehicle.

Decision Unit VII

The AND circuit 44 provides an output signal only when the output signals of the comparators 34, 36, 37 and 42 in the relative velocity detecting unit V, the collision time detecting unit III, the minimum level detecting unit IV and the direction detecting unit VI are simultaneously applied to the AND circuit 44. The AND circuit 45 provides an output signal only when both of the right and left AND circuits 44 provide output signals so that the safeguarding device operatively coupled to the collision anticipating device of the present may be actuated at the optimum time under the predetermined conditions.

In the fourth embodiment, only when the right and left collision time detecting units III, minimum level detecting units IV, relative velocity detecting units V and direction detecting units VI simultaneously provide output signals to the decision unit VII, the latter provides an output collision signal to actuate the safeguarding device. Therefore the inadvertent operation of the safeguarding device due to variations of reflection factors and shapes of objects, due to an object merely passing across the path of a vehicle or due to the vehicle passing past an object so that no collision occurs, or when a vehicle is traveling at a low speed or is at rest so that a driver will not be seriously injured even in collision, will be prevented. Further, the method for measuring the distance to an object employed in theh present invention can detect an object even at a very close distance, for example, 1 to 2 meters from a vehicle with an extreme accuracy so that even when a vehicle collides against another vehicle at a very high speed, the safeguarding device may be actuated at the optimum time. In the radar system employed in the present invention, the same intensity ratio gives two different distances to an object, but this problem has been overcome by the arrangements of the transmitting and receiving antennas 9 and 10 and by the provision of the minimum level detecting unit VI in accordance with the present invention.

In the fourth embodiment, the collision time is not always measured, but the system for detecting whether the collision time is within a predetermined time or not is employed. However the effects of the collision anticipating device of the present invention are substantially similar to those of the prior art devices of the type which always measures the collision time. Moreover the electronic circuitry is simpler in construction, more reliable in operation and less expensive to manufacture. Furthermore the relative velocity V is so designed so as not to provide an output signal when the detected relative velocity is less than 30 Km/h. In other words, the relative velocity detecting unit V provides an signal only when the safeguarding device is needed to be actuated, i.e., when the relative velocity is in a range between 30 Km/h and 100 Km/h, so that the frequency band of the signals to be processed by the unit V may be narrow. Therefore the electronic circuitry becomes simpler in construction, and accordingly more reliable in operation and less expensive to manufacture. The decision time detection circuit comprising the counter 24 and the RS flip-flop 25 deals with 15 waves of the Doppler signal as one time unit (20 cm in terms of distance) so that even when a few of the 15 waves are distorted by noise, the inadvertent operation of the safeguarding device may be prevented because of the effect of the integration. If microwave energy of 10 GHz is used as in the instant embodiment, the intensity of the wave reflected by an object having complicated shapes such as a vehicle is liable to be considerably suppressed at the minimum of every 50 cm, but the suppression corresponds to only a few of the fifteen waves of the Doppler signal so that the inadvertent operation of the safeguarding device may be also prevented.

The collision anticipating device is not necessarily required to actuate the safeguarding device a predetermined time before a vehicle collides against an object. The safeguarding device may be actuated a relatively long time before a vehicle collides against an object when the collision is unavoidable. When an object is located near the side of a vehicle, the detected relative velocity will be lower than the true relative velocity so that the collision time detected may not be accurate. As a result, the safeguarding device will be actuated too late to safeguard the driver and the passengers. To overcome this problem, the present invention provides a fifth embodiment in which the decision unit VII provides an output signal independently of the collision time when the distance to an object is less than a predetermined distance.

Figure 1E:
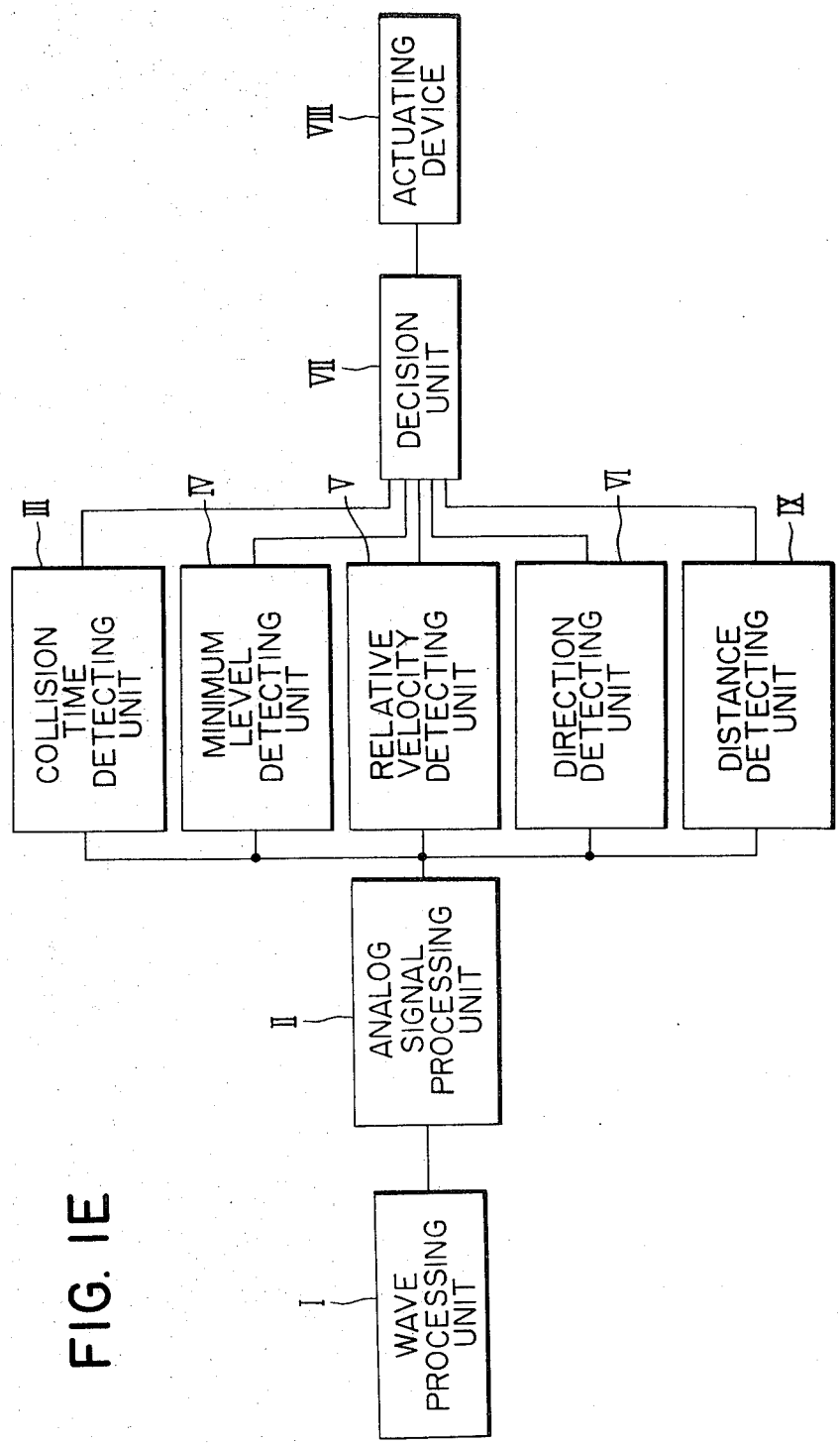

Fifth Embodiment, FIGS. 1(E) and 9

As shown in FIG. 1(E), the fifth embodiment is substantially similar to the fourth embodiment except that a distance detecting unit IX is inserted between the analog signal processing unit II and the decision unit VII.

Figure 9A:
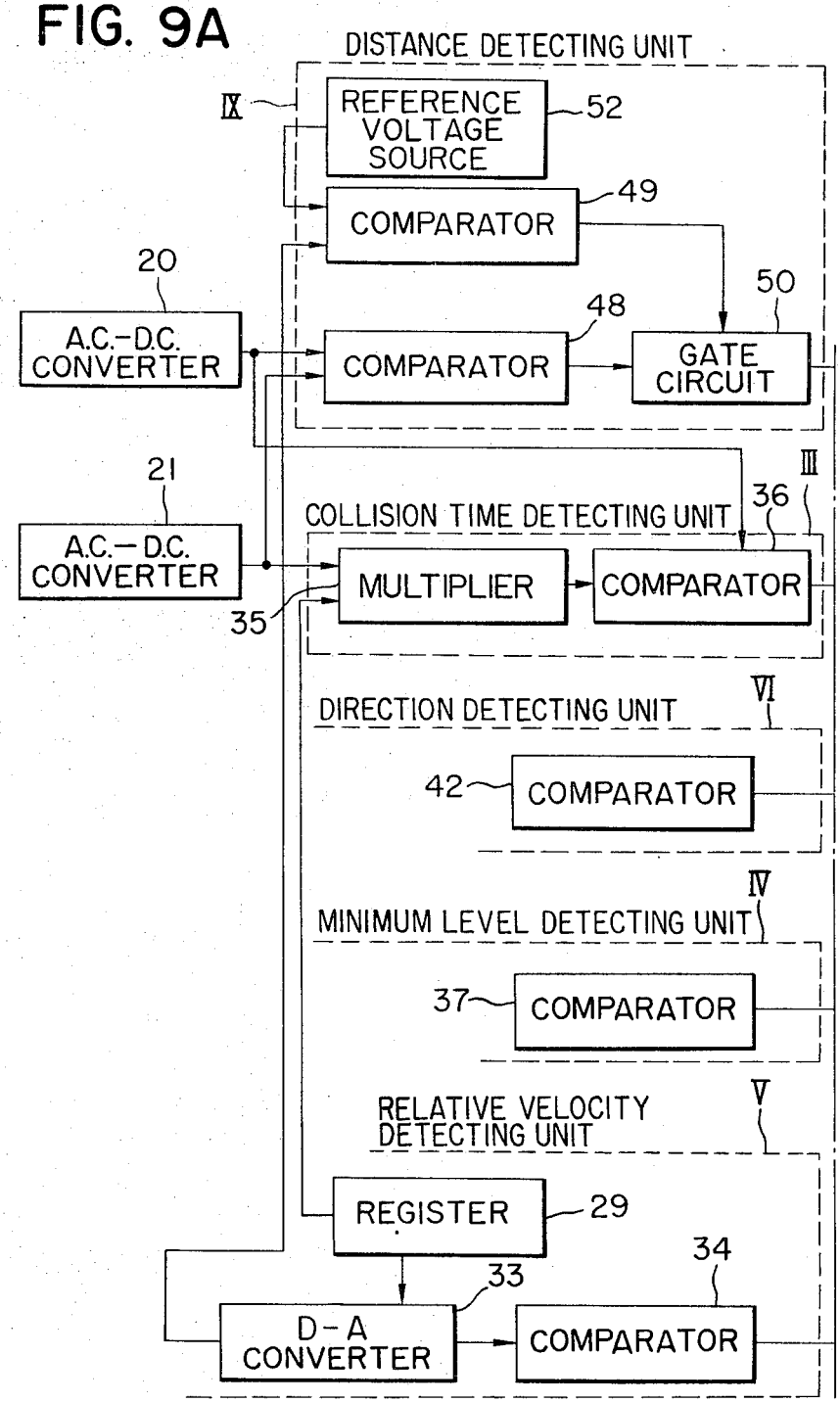

Distance Detecting Unit IX, FIGS. 9A and 9B

The distance detecting unit IX for detecting the distance to an object generally comprises comparators 48 and 49, a gate circuit 50 and a reference voltage source 52. The comparator 48 has input terminals connected to the output terminals of the AC - DC converters 20 and 21 in the analog signal processing unit II, and has an output terminal connected to one of the input terminals of the gate circuit 50. The comparator 48 compares the output voltage of the AC - DC converter 20 with that of the AC - DC converter 21 so that the comparator 48 provides an output signal to the gate circuit 50 only when the voltage of the AC-DC converter 20 is higher than that of AC-DC converter 21. The comparator 49 has the input terminals connected to the output terminal of the D - A converter 33 in the relative velocity detecting unit V and to the output terminal of the reference voltage source 52, and the output terminal connected to the other input terminal of the gate circuit 50. The comparator 49 compares the output voltage of the D - A converter 33 with the reference voltage supplied from the reference voltage source 52 so that the comparator 49 provides an output signal to the gate circuit 50 only when the voltage of the D-A converter 33 is less than that of the reference voltage source 52. The gate circuit 50 functions to pass the output signal from the comparator 48 only when the output signal from the comparator 49 is applied to the gate circuit 50. The decision circuit VII comprises five AND circuits 53, 55, 56, 57 and 58 and an OR circuit 54. The AND circuit 53 has the input terminals connected to the output terminals of the comparators 36 in the right and left collision time detecting units. The OR circuit 54 has three input terminals connected to the output terminal of the AND circuit 53 and to the output terminals of the gate circuits 50 in the right and left distance detecting units IX. The AND circuit 55 has the input terminals connected to the output terminals of the comparators 42 in the right and left direction detecting circuits VI. The AND circuit 56 has input terminals connected to the output terminals of the comparators 37 in the right and left minimum level detecting units IV. The AND circuits 57 has the input terminals connected to the output terminals of the comparators 34 in the right and left relative velocity detecting units V. The AND circuit 58 has the input terminals connected to the output terminals of the OR circuit 54 and the AND circuits 55 to 57, and has an output terminal connected to the input terminal of the device 46 for actuating the safeguarding device.

Operation of Distance Detecting Unit IX

The comparator 48 provides an output signal to the gate circuit 50 only when the output volrage of the AC - DC converter 20 is higher than that of the AC - DC converter 21. Since the output signals of the AC - DC converters 20 and 21 are a function of the distance to an object, the comparator 48 provides an output signal when an object comes into a predetermined distance range, such range being one meter from the vehicle in the instant embodiment. The reference Voltage supplied from the source 52 is the output voltage corresponding to the relative velocity of 50 Km/h so that the comparator 49 provides an output signal to the gate circuit 50 only when the relative velocity of an object with respect to the vehicle is less than 50 Km/h. In other words, the output signal of the comparator 48 is fed into the OR circuit 54 only when the relative velocity is less than 50 Km/h. Therefore, when the distance to an object is less than one meter and the relative velocity is less than 50 Km/h, the output signal of the OR circuit 54 is fed to the AND circuit 58 regardless of the presence or absence of the output signal of the comparator 36 in the collision time detecting unit III, that is regardless whether the collision time is less than a predetermined time or not.

When an object is moving at the relative velocity of more than 50 Km/h, but off the course of the vehicle, the apparent or detected relative velocity will be less than 50 Km/h and the apparent or detected distance to an object will be longer than the actual distance. Therefore, the safeguarding device will be actuated too late, when only the collision time is detected. However, in the fifth embodiment of the present invention, the distance to an object is also detected when the relative velocity is less than 50 Km/h so that when the distance to an object becomes less than one meter, the safeguarding device will be actuated regardless of the collision time. Therefore, unlike the device in which only the collision time is detected, the delay in operation of the safeguarding device due to the low detected relative velocity may be prevented.

In addition to the many novel features of the present invention described above, the present invention has the following feature over the system in which a safeguarding device is actuated only in response to a predetermined distance to an object. According to the present invention, the distance to an object and the relative velocity of the object with respect to a vehicle are detected to obtain a time left before the vehicle collides against the object so that a device for safeguarding a driver in case of collision may be actuated at the optimum time. Therefore, in the present invention, the safeguarding device may be actuated positively before the collision occurs, while in the system in which only the distance to an object is measured, there is a danger that the safeguarding device may be actuated too late when the relative velocity is high.

The above embodiments employ the special radar system which can detect the distance to an object even at a short distance with high accuracy and which gives two different distances to an object from the same intensity ratio, but it should be understood that the present invention is not limited thereto. Any suitable radar system which detects the distance from a phase difference such as the AM radar system or two-frequency radar system may be employed in the present invention to detect whether the collision time is less than a predetermined time or not, thereby actuating a safeguarding device at the optimum time for protecting a driver in case of collision. Moreover, the predetermined collision time at which the safeguarding device is actuated may be suitably adjusted. In the above embodiments, the bistatic radar systems having two transmitting antennas and two receiving antennas have been described, but the present invention may employ any bistatic radar system using one or more transmitting antennas and receiving antennas.

It will be understood that various modifications and variations may be effected without departing from the scope of the present invention.

What is claimed is:

1. A vehicle collission anticipating device comprising
    wave processing means for transmitting a wave by a transmitting antenna installed at a predetermined position and angle of a vehicle, for receiving a reflected wave from an object by a receiving antenna installed at predetermined position and angle of the vehicle, and for generating a low frequency wave by mixing said transmitted and reflected waves, said receiving antenna being so installed that the beam axis of said receiving antenna intersects that of said transmitting antenna in a predetermined range,
    analog signal processing means connected to said wave processing means for signal processing said low frequency wave into at least one Doppler signal obtained from said low frequency wave, and for generating additional signals corresponding to the intensity and frequency of the various frequency components of said low frequency wave,
    collision time detecting means connected to said analog signal processing means for detecting a collision time which is determined by a distance between the vehicle and object and a relative velocity of the object with respect to the vehicle in response to the additional signals from said analog signal processing means, and for generating a signal when said collision time reaches a predetermined time,
    minimum level detecting means connected to said analog signal processing means for detecting an intensity of said Doppler signal obtained from said low frequency wave, and for generating a signal when said intensity of said Doppler signal reaches a predetermined minimum level so as to detect the object to enter a predetermined detection range defined by the positions and angles of the transmitting and receiving antennas, and
    decision means connected to said collision time detecting means and minimum level detecting means for generating a signal in response to the simultaneous generation of signals by said collision time detecting means and minimum level detecting means,
    thereby anticipating a collision of the object against the vehicle.

2. A vehicle collision anticipating device as set forth in claim 1, further comprising
    relative velocity detecting means connected to said analog signal processing means for detecting a relative velocity of the object with respect to the vehicle in response to the additional signals for said analog signal processing means and for generating a signal when said relative velocity reaches a predetermined velocity, and wherein
    said decision means is further connected to said relative velocity detecting means for generating a signal in response to the simultaneous generation of signals by said collision time detecting means, minimum level detecting means and relative velocity detecting means.

3. A vehicle collision anticipating device as set forth in claim 1, further comprising
    direction detecting means connected to said analog signal processing means for detecting a direction of a relative movement of the object with respect to the vehicle in response to the signals from said analog signal processing means and for generating a signal when the object approaches the vehicle, and wherein
    said decision means is further connected to said direction detecting means for generating a signal in response to the simultaneous generation of signals by said collision time detecting means, minimum level detecting means and direction detecting means.

4. A vehicle collision anticipating device as set forth in claim 2, further comprising
    direction detecting means connected to said analog signal processing means for detecting a direction of a relative movement of the object with respect to the vehicle in response to the signals from said analog signal processing means and for generating a signal when the object approaches the vehicle, and wherein
    said decision means is further connected to said direction detecting means for generating a signal in response to the simultaneous generation of signals by said collision time detecting means, minimum level detecting means, relative velocity detecting means and direction detecting means.

5. A vehicle collision anticipating device as set forth in claim 1, further comprising
    distance detecting means connected to said analog signal processing means for detecting a distance between the vehicle and object in response to the signals from said analog signal processing means, and for generating a signal when the distance reaches a predetermined distance, and wherein said decision means is further connected to said distance detecting means for generating a signal in response to the simultaneous generation of signals by said minimum level detecting means, and one of said collision time detecting means and said distance detecting means.

6. A vehicle collision anticipating device as set forth in claim 4, further comprising distance detecting means connected to said analog signal processing means for detecting a distance between the vehicle and object in response to the signals from said analog signal processing means, and for generating a signal when the distance reaches a predetermined distance, and wherein said decision means is further connected to said distance detecting means for generating a signal in response to the simultaneous generation of signals by said minimum level detecting means, relative velocity detecting means, direction detecting means, and one of said collision time detecting means and said distance detecting means.

7. A vehicle collision anticipating device as set forth in claim 1, wherein said collision time detecting means comprises means for detecting the distance between the vehicle and object by computing an intensity ratio between the maximum values of at least two Doppler signals for detecting the relative velocity of the object from an angular frequency of the Doppler signal, and for detecting the collision time by dividing said distance by said relative velocity.

8. A vehicle collision anticipating device as set forth in claim 2, wherein said analog signal processing means further comprises means for separating the low frequency wave into at least two frequency components and wherein said Doppler signal is derived from a lower of said frequency components and further comprises means for deriving an additional Doppler signal from a higher of said frequency components, said collision time detecting means comprises means for detecting the distance between the vehicle and object by computing an intensity ratio between the maximum values of at least said two Doppler signals, for detecting the relative velocity of the object from an angular frequency of the Doppler signal, and for detecting the collision time by dividing said distance by said relative velocity, and said relative velocity detecting means comprises means for detecting an angular frequency of one of said Doppler signals so as to detect the relative velocity of the object with respect to the vehicle.

9. A vehicle collision anticipating device as set forth in claim 3, wherein said collision time detecting means comprises means for detecting the distance between the vehicle and object by computing an intensity ratio between the maximum values of at least two of said Doppler signals for detecting the relative velocity of the object from an angular frequency of one of the Doppler signals, and for detecting the collision time by dividing said distance by said relative velocity, and said direction detecting means comprises means for detecting a phase relation between at least two of said Doppler signals so as to detect the direction of the relative movement of the object with respect to the vehicle.

10. A vehicle collision anticipating device as set forth in claim 4, wherein said collision time detecting means comprises means for detecting the distance between the vehicle and object by computing an intensity ratio between the maximum values of at least two of said Doppler signals, for detecting the relative velocity of the object from an angular frequency of one of the Doppler signals, and for detecting the collision time by dividing said distance by said relative velocity.

said relative velocity detecting means comprises means for detecting an angular frequency of one of the Doppler signals so as to detect the relative velocity of the object with respect to the vehicle, and said direction detecting means comprises means for detecting a phase relation between at least two of the Doppler signals so as to detect the direction of the relative movement of the object with respect to the vehicle.

11. A vehicle collision anticipating device as set forth in claim 5, wherein said collision time detecting means comprises means for detecting the distance between the vehicle and object by computing an intensity ratio between the maximum values of at least two of the Doppler signals, for detecting the relative velocity of the object from an angular frequency of one of the Doppler signals, and for detecting the collision time by dividing said distance by said relative velocity, and said distance detecting means comprises means for calculating an intensity ratio between the maximum values of at least two of the Doppler signals so as to detect the distance between the vehicle and object.

12. A vehicle collision anticipating device as set forth in claim 6, wherein said distance detecting means comprises means for calculating an intensity ratio between the maximum values of at least two of the Doppler signals so as to detect the distance between the vehicle and object, said collision time detecting means comprises means for detecting the distance between the vehicle and object by computing an intensity ratio between the maximum values of at least two of the Doppler signals, for detecting the relative velocity of the object from an angular frequency of one of the Doppler signals, and for detecting the collision time by dividing said distance by said relative velocity, and said relative velocity detecting means comprises means for detecting an angular frequency of one of the Doppler signals so as to detect the relative velocity of the object with respect to the vehicle, and said direction detecting means comprises means for detecting a phase relation between at least two of the Doppler signals so as to detect the direction of the relative movement of the object with respect to the vehicle.

13. A vehicle collision anticipating device as set forth in claim 7,, wherein said wave processing means comprises two wave processing units, each of said wave processing units comprising a sine wave generator, a microwave modulator connected to said sine wave generator, a microwave oscillator connected to said microwave modulator, a coupler connected to said microwave oscillator, a transmitting antenna connected to said coupler, a receiving antenna connected to said coupler, and a first mixer connected to said coupler, and the right and left transmitting and receiving antennas being so mounted on the vehicle that the beams thereof intersect each other to form the predetermined detection ranges, said analog signal processing means comprises two analog signal processing units, said collision time detecting means comprises two collision time detecting units in which said collision time is predetermined to be 100 msec, said minimum level detecting means comprises two minimum level detecting units, and said decision means comprises a decision unit for generating a signal in response to the simultaneous generation of signals by said collision time detecting units and minimum level detecting units.

14. A vehicle collision anticipating device as set forth in claim 8, wherein said wave processing means comprises two wave processing units, each of said wave processing units comprises in a sine wave generator, a microwave modulator connected to said sine wave generator, a microwave oscillator connected to said microwave modulator, a coupler connected to said microwave oscillator, a transmitting antenna connected to said coupler, a receiving antenna connected to said coupler, and a first mixer connected to said coupler, and the right and left transmitting and receiving antennas being so mounted on the vehicle that the beams thereof intersect each other to form the predetermined detection ranges, said analog signal processing means comprises two analog signal processing units, said collision time detecting means comprises two collision time detecting units in which said collision time is predetermined to be 100 msec, said minimum level detecting means comprises two minimum level detecting units, said relative velocity detecting means comprises two relative velocity detecting units in which said relative velocity is predetermined to be 30 Km/h, and said decision means comprises a decision unit for generating a signal in response to the simultaneous generation of signals by said collision time detecting units, minimum level detecting units and relative velocity detecting units.

15. A vehicle collision anticipating device as set forth in claim 9, wherein said wave processing means comprises two wave processing units, each of said wave processing units comprising a sine wave generator, a microwave modulator connected to said sine wave generator, a microwave oscillator connected to said microwave modulator, a coupler connected to said microwave oscillator, a transmitting antenna connected to said coupler, a receiving antenna connected to said coupler, and a first mixer connected to said coupler, and the right and left transmitting and receiving antennas being so mounted on the vehicle that the beams thereof intersect each other to form the predetermined detection ranges, said analog signal processing means comprises two analog signal processing units, said collision time detecting means comprises two collision time detecting units in which said collision time is predetermined to be 100 msec, said minimum level detecting means comprises two minimum level detecting units, said direction detecting means comprises two direction detecting units for detecting a phase relation between at least two of the Doppler signals, and said decision means comprises a decision unit for generating a signal in response to the simultaneous generation of signals by said collision time detecting units, minimum level detecting units and direction detecting units.

16. A vehicle collision anticipating device as set forth in claim 10, wherein said wave processing means comprises two wave processing units, each of said wave processing units comprising a sine wave generator, a microwave modulator connected to said sine wave generator, a microwave oscillator connected to said microwave modulator, a coupler connected to said microwave oscillator, a transmitting antenna connected to said coupler, a receiving antenna connected to said coupler, and a first mixer connected to said coupler, and the right and left transmitting and receiving antennas being so mounted on the vehicle that the beams thereof intersect each other to form the predetermined detection ranges, said analog signal processing means comprises two analog signal processing units, said collision time detecting means comprises two collision time detecting units in which said collision time is predetermined to be 100 msec, said minimum level detecting means comprises two minimum level detecting units, said relative velocity detecting means comprises two relative velocity detecting units in which said relative velocity is predetermined to be 30 Km/h, each of said relative velocity detecting units comprises a decision time detecting circuit which is reset every 15 waves of the Doppler signal and generates a signal to said collision time detecting means in order to prevent the inadvertent operation of the vehicle collision anticipating device, said direction detecting means comprises two direction detecting units for detecting a phase relation between at least two of the Doppler signals, and said decision means comprises a decision unit for generating a signal in response to the simultaneous generation of signals by said collision time detecting units, minimum level detecting units, relative velocity detecting units and direction detecting units.

17. A vehicle collision anticipating device as set forth in claim 12, wherein said wave processing means comprises two wave processing units, each of said wave processing units comprising a sine wave generator, a microwave modulator connected to said sine wave generator, a microwave oscillator connected to said microwave modulator, a coupler connected to said microwave oscillator, a transmitting antenna connected to said coupler, a receiving antenna connected to said coupler, and a first mixer connected to said coupler, and the right and left transmitting and receiving antennas being so mounted on the vehicle that the beams thereof intersect each other to form the predetermined detection ranges, said analog signal processing means comprises two analog signal processing units, said collision time detecting means comprises two collision time detecting units in which said collision time is predetermined to be 100 msec, said minimum level detecting means comprises two minimum level detecting units, said relative velocity detecting means comprises two relative velocity detecting units in which said relative velocity is predetermined to be 30 Km/h, said direction detecting means comprises two direction detecting units for detecting a phase relation between at least two of the Doppler signals, said distance detecting means comprises two distance detecting units for calculating an intensity ratio between the maximum values of at least two Doppler signals, and said decision means comprises a decision unit for generating a signal in response to the simultaneous generation of signals by said minimum level detecting units, relative velocity detecting units, direction detecting units, and one of said collision time detecting units or said distance detecting units.

18. A vehicle collision anticipating device as set forth in claim 16, wherein said analog signal processing unit comprises a wide band amplifier connected to said first mixer of said wave processing unit, a first bandpass filter connected to said wide band amplifier, a first AC-DC converter connected to said first bandpass filter, a first wave shaping circuit connected to said first bandpass filter, a second mixer connected to said wide band amplifier and to said sine wave generator, a second bandpass filter connected to said second mixer, a second AC-DC converter connected to said second bandpass filter, and a second wave shaping circuit connected to said second bandpass filter, said collision time detecting unit comprises a multiplier connected to said second AC-DC converter of said analog signal processing unit and a comparator connected to said multiplier and to said first AC-DC converter, said minimum level detecting unit comprises a comparator connected to said second wave shaping circuit of said analog signal processing unit and a reference voltage source which is connected to said comparator and supplies a reference voltage, said relative velocity detecting unit comprises a first counter connected to said second wave shaping circuit of said analog signal processing unit, an RS flip-flop connected to said first counter, and AND circuit connected to said RS flip-flop, a clock pulse generator connected to said AND circuit, an OR circuit connected to said first counter, a first delay circuit connected to said OR circuit, a second delay circuit connected to said first delay circuit, a second counter connected to said AND circuit, OR circuit and second delay circuit, a register connected to said first delay circuit, said second counter and said multiplier of said collision time detecting unit a D-A converter connected to said register, and a comparator connected to said D-A converter and a reference voltage source, said direction detecting unit comprises a D-type flip-flop connected to said first and second wave shaping circuits of said analog signal processing unit, a monostable and multivibrator connected to said D-type flip-flop, an integrator connected to said monostable multivibrator, and a comparator connected to said integrator and a reference voltage source, and said decision unit comprises three AND circuits which are connected to said collision distance detecting unit, minimum level detecting unit, relative velocity detecting unit, and direction detecting unit.

19. A vehicle collision anticipating device as set forth in claim 17, wherein said analog signal processing unit comprises a wide band amplifier connected to said first mixer of said wave processing unit, a first bandpass filter connected to said wide band amplifier, a first AC-DC converter connected to said first bandpass filter, a first wave shaping circuit connected to said first bandpass filter, a second mixer connected to said wide band amplifier and to said sine wave generator, a second bandpass filter connected to said second mixer, a second AC-DC converter connected to said second bandpass filter, and a second wave shaping circuit connected to said second bandpass filter, said collision time detecting unit comprises a multiplier connected to said second AC-DC converter of said analog signal processing unit, and a comparator connected to said multiplier and to said first AC-DC converter said minimum level detecting unit comprises a comparator connected to said second wave shaping circuit of said analog signal processing unit and a reference voltage source which is connected to said comparator and supplies a reference voltage, said relative velocity detecting unit comprises a first counter connected to said wave shaping circuit of said analog signal processing unit, an RS flip-flop connected to said first counter, an AND circuit connected to said RS flip-flop, a clock pulse generator connected to said AND circuit, an OR circuit connected to said first counter, a first delay circuit connected to said OR circuit, a second delay circuit connected to said first delay circuit, a second counter connected to said AND circuit, OR circuit and second delay circuit, a register connected to said first delay circuit, said second counter and said multiplier of said collision time detecting unit a D-A converter connected to said register, and a comparator connected to said D-A converter and a reference voltage source, said direction detecting unit comprises a D-type flip-flop connected to said first and second wave shaping circuits of said analog signal processing unit, a monostable multivibrator connected to said D-type flip-flop, an integrator connected to said monostable multivibrator, and a comparator connected to said integrator and a reference voltage source, said distance detecting unit comprises a first comparator connected to said first and second AC-DC converters and a second comparator connected to said D-A converter, a gate circuit connected to said first and second comparators and a reference voltage source connected to said second comparator, and said decision unit comprises a first AND circuit connected to said collission time detecting unit, an OR circuit connected to said first AND circuit and to said distance detecting units, and second to fourth AND circuits respectively connected to said direction detecting units, to said minimum level detecting units and to said relative velocity detecting units, and a fifth AND circuit connected to said OR circuit and to said second to fourth AND circuits.

* * * * *

UNITED STATES PATENT OFFICE
CERTIFICATE OF CORRECTION

Patent No. 3,864,678                    Dated February 4, 1975

Inventor(s) Teruo Yamanaka, et al

It is certified that error appears in the above-identified patent and that said Letters Patent are hereby corrected as shown below:

Column 6, line 43:  cancel "$107_c$" and insert -- $\omega_c$ --.

Column 8, line 7:   change "invenntion" to --invention--.

Column 11, line 19: change "collisionn" to --collision--.

Column 12, line 13: change "terinal" to --terminal--.

Column 14, line 53: change "mulip-" to --multip- --.

Column 16, line 36: change "theh" to --the--.

Column 22, line 62: change "7,," to --7, --.

On the Title Page, please change the order of appearance of the Assignees' names to: Toyota Jidosha Kogyo Kabushiki Kaisha; Kabushiki Kaisha Toyota Chuo Kenkyusho Signed and Sealed this twenty-fourth Day of February 1976

[SEAL]

Attest:

RUTH C. MASON
*Attesting Officer*

C. MARSHALL DANN
*Commissioner of Patents and Trademarks*